(12) United States Patent
Li et al.

(10) Patent No.: US 9,961,976 B2
(45) Date of Patent: May 8, 2018

(54) SCOOTER LUGGAGE

(71) Applicant: Shenzhen Iubest Technology Co., Ltd, Shenzhen, Guangdong (CN)

(72) Inventors: Jian Li, Shenzhen (CN); Yongfeng Li, Shenzhen (CN); Zhaoyun Chu, Shenzhen (CN)

(73) Assignee: Shenzhen Iubest Technology Co., Ltd., Shenzhen (CN)

( * ) Notice: Subject to any disclaimer, the term of this patent is extended or adjusted under 35 U.S.C. 154(b) by 0 days. days.

(21) Appl. No.: 14/718,542

(22) Filed: May 21, 2015

(65) Prior Publication Data
US 2016/0339984 A1 Nov. 24, 2016

(51) Int. Cl.
*B62K 23/02* (2006.01)
*A45C 5/14* (2006.01)
(Continued)

(52) U.S. Cl.
CPC ............... *A45C 5/14* (2013.01); *A45C 9/00* (2013.01); *B62J 7/06* (2013.01); *B62J 9/003* (2013.01);
(Continued)

(58) Field of Classification Search
CPC ...... A45C 5/14; A45C 9/00; B62J 7/06; B62J 9/003; B62K 3/002; B62K 13/00; B62K 15/00; B62K 19/40
(Continued)

(56) References Cited

U.S. PATENT DOCUMENTS

| 6,381,889 B1 * | 5/2002 | Knapp | G09F 7/18 160/378 |
| 8,627,554 B1 * | 1/2014 | Hagan | A44B 11/2569 24/579.11 |

(Continued)

*Primary Examiner* — Jacob D Knutson
(74) *Attorney, Agent, or Firm* — Andrus Intellectual Property Law, LLP

(57) ABSTRACT

A limiting plate control mechanism and a scooter luggage being capable to use this limiting device mechanism are provided. This limiting control device includes the first shell, second shell, sliding pressing block, first slider, second slider, first elastic element and the second elastic element. The first shell and second shell consists of the cavity shell. The sliding pressing block, first slider, second slider, first elastic element and second elastic element are all located in the cavity shell. This limiting plate control device has a simple structure and friendly operation, which brings convenience to the user. This scooter luggage has a simple structure, and is easy to operate and fold. A kind of button shell and a scooter luggage being capable to apply this button shell are provided. This button shell includes a spilt frame which is provided with the first baffle and second baffle. The first baffle is provided with a limiting bump, and the second baffle is provided with a limiting groove. There is a clearance between the first baffle and second baffle. The split frame includes the first split frame and the second split frame. The first split frame has the same structure with the second split frame. The limiting protrusion of the first split frame is embedded into the limiting slot of the second split frame, forming the first supporting plate. The limiting protrusion of the second split frame is embedded into the limiting slot of the first split frame, forming the second supporting plate. The button shell comprises the spatial accommodation constituted by the clearance between the first supporting plate and second supporting plate, which is provided with button limiting slot. This button shell has (Continued)

simple structure, and is easy to assemble and operate, which brings convenience to the user.

8 Claims, 29 Drawing Sheets

(51) Int. Cl.

| | | |
|---|---|---|
| *B62J 7/06* | (2006.01) | |
| *B62K 19/40* | (2006.01) | |
| *A45C 9/00* | (2006.01) | |
| *B62J 9/00* | (2006.01) | |
| *B62K 3/00* | (2006.01) | |
| *B62K 13/00* | (2006.01) | |
| *B62K 15/00* | (2006.01) | |
| *B62K 19/18* | (2006.01) | |
| *B62K 21/16* | (2006.01) | |

(52) U.S. Cl.
CPC .............. *B62K 3/002* (2013.01); *B62K 13/00* (2013.01); *B62K 15/00* (2013.01); *B62K 19/40* (2013.01); *A45C 2009/005* (2013.01); *B62K 15/006* (2013.01); *B62K 19/18* (2013.01); *B62K 21/16* (2013.01)

(58) Field of Classification Search
USPC ......... 16/110.1, 113.1, 114.1, 405, 429, 444, 16/446; 190/115, 18 A; 220/757, 762; 280/37, 202
See application file for complete search history.

(56) References Cited

U.S. PATENT DOCUMENTS 9,403,546 B1* 8/2016 Su .............................. B62B 1/12
2010/0205779 A1* 8/2010 Wang ................... A45C 13/262
16/405

* cited by examiner

SCOOTER LUGGAGE

TECHNICAL FIELD OF THE INVENTION

The present invention relates to the field of machinery construction, and in particular, to the scooter luggage.

BACKGROUND OF THE INVENTION

Currently, the scooter has already become a main recreation utility applied by many children. The scooter is capable to be folded. Unfold the scooter for use, and fold it up for easy storage. The limiting plate is required to control the folding of the scooter. When the folding of the scooter is controlled by buttons, button shells are required to fix the buttons. At present, difficulties have been brought to the user due to the complicated structure and inconvenient operation of the control mechanism of the limiting plate and button shell.

With the prevalence of the scooter, scooter luggage has emerged currently, which integrates the luggage and scooter. Similarly because of the complicated structure and inconvenient operation of the control mechanism of the limiting plate and button shell, the complicated structure and inconvenient folding of the scooter luggage have brought difficulties to the user.

The current scooter luggage has the defect of being unable to change directions, which is inconvenient to use.

SUMMARY OF THE INVENTION

The purpose of the present disclosure is to solve the above-mentioned existing technical problems.

According to one aspect of the present disclosure, a kind of limiting plate control mechanism is provided, which comprises the first shell, second shell, sliding body, first contact body, second contact body, flexible joint. The first shell 101 and second shell 102 combine into the cavity shell. The sliding body, first contact body and second contact body are all located in the cavity shell. The sliding body can slide in the cavity shell. The first contact body connects with the sliding body. The second contact body connects with the inner surface of the cavity shell; the flexible joint bypasses the first contact body and second contact body, and two ends of the flexible joint stick out of the cavity shell; when the cavity shell moves along the flexible joint, the displacement of the flexible joint does not be caused; when the first contact body sliding compresses the flexible joint, one end of the flexible joint will retract inward the cavity shell.

Optionally, the first contact body is the first pulley, and the second connect body is the second pulley. The flexible joint is wire rope. The first pulley is set on the sliding body, and the first pulley can make fixed-point rotation on the sliding body. The second pulley is set on the inner surface of the cavity shell, and the second pulley can make fixed-point rotation on the inner surface of the cavity shell.

Optionally, this limiting plate control mechanism also comprises the sliding body spring which can reset the sliding body, one end of the sliding body spring is pressed against the sliding body, and the other end of the sliding body spring is pressed against the inner surface of the cavity shell.

Optionally, the end part of the flexible joint penetrates into one end of the cavity shell, bypasses the bottom of the first contact body and the top of the second contact body in succession, and penetrates out of the other end of the sliding body spring cavity shell.

The present disclosure also provides a kind of scooter luggage equipped with the limiting plate control mechanism, including the first link rod, limiting plate, scooter body, luggage; the scooter body comprises the slide plate and frame that connect with each other, and are able to open and fold. The luggage is installed on the frame; the first link rod connects with the sliding body; one end of the flexible joint connects with the limiting plate; the other end of the sliding body spring flexible body connects with the frame; the limiting plate is used to limit the folding and unfolding of the slide plate and frame.

Optionally, this scooter luggage also comprises a slider. The slider is provided with convex column. The slider is located in the cavity shell; the cavity shell is provided with the hole allowing the convex column to extend and retract; the slider is located in the cavity shell. This scooter luggage also comprises the driving mechanism allowing the slider to transversely slide in the cavity shell.

Optionally, this scooter luggage also comprises the second link rod. The driving mechanism comprises the pressing block, slider spring. The slider groove is set on the inner surface of the cavity shell; the slider is located in the slider groove; the slider spring is located between the slider and the inner surface of the slider groove, and the slider spring is contacted respectively with the slider and inner surface of the slider groove; the convex column sticks out of the hole; the second link rod is connected with the pressing block; the pressing block is located in the cavity shell, and the pressing block is able to longitudinally slide along the cavity shell. The pressing block is provided with pressing block inclined surface; the slider is provided with slide inclined surface; the pressing block inclined surface is pressed above the slider inclined surface.

Optionally, the scooter frame comprises a tie rod inner tube, tie rod exterior tube, angle seat, handle, first button, second button, limiting plate spring. The cavity shell, first link rod and second link rod are all located in the inner tube of the tie rod; the first link rod and second link rod can move inside of the tie rod inner tube. The cavity shell is fixed to connect within the tie rod inner tube. The tie rod inner tube is provided with the tie rod inner tube hole. The convex column sticks out of the tie rod inner tube hole. The first button is connected with the first link rod, and the second button is connected with the second link rod. The second button is provided with the installation hole; the first button is located in the installation hole; the second button is installed at the end part of the of the tie rod inner tube; the handle 604 is installed on the end part of the tie rod inner tube 601; the tie rod inner tube is located inside the tie rod exterior tube, and the tie rod inner tube is able to move within the tie rod exterior tube. The tie rod exterior tube is provided with several tie rod exterior tube holes where the convex columns stick out. The tie rod exterior tube is connected with the angle seat, and the angle seat is provided with open slot. The limiting plate is located in the open slot; one end of the limiting plate spring is pressed against the open slot; the other end of the sliding body spring limiting plate spring is pressed against the bottom of the limiting plate; the flexible joint is located in the tie rod inner tube; the other end of the sliding body spring flexible joint is fixedly connected with the tie rod exterior tube; the slide plate is provided with angle head, and the angle head forms a flexible connection with the angle seat; the angle head is provided with at least two limiting slots in which the limiting plate can be embedded.

Optionally, the slide plate comprises a front axle, front wheel, front fork, peddle support, rear wheel, fork crown cover. The fork crown cover is rotationally fixed to the angle head. The front fork is connected with the front axle; the fork crown cover is rotationally connected with the front fork; the angle head is provided with connection sheet which is connected with the front axle. There are two front wheels which are respectively installed on both ends of the front axle. The front end of the peddle support is connected with the fork crown cover; the tail end of the peddle support is equipped with the rear wheel.

As an option, the front axle is provided with the first guide wheel and second guide wheel. The fork crown cover is provided with the first supporting inclined surface and second supporting inclined surface. The front fork is located between the first guide wheel and second guide wheel; the first guide wheel is contacted with the first supporting inclined surface, and the second guide wheel is contacted with the second supporting inclined surface.

According to another aspect of the present disclosure, another kind of limiting plate control device is provided, which comprises the first shell, second shell, sliding pressing block, first slider, second slider, first elastic element, second elastic element. The first shell and second shell composes the cavity shell; the sliding pressing block, first slider, second slider, first elastic element and second elastic element are all located in the cavity shell; the sliding pressing block can move longitudinally along the cavity shell; the first slider and second slider can slide transversely along the cavity shell. The longitudinal direction refers to the direction from the end part of the cavity shell to the root of it; the transverse direction refers to the direction from the first shell to second shell. The first slider limiting slot and second slider limiting slot are installed in the cavity shell; the first slider is located in the first slider limiting slot, and the second slider is located in the second slider limiting slot. The first shell is provided with the first shell hole; the first slider is provided with the first slider protrusion, and the second slider is provided with the second slider protrusion; the second shell is provided with the second shell hole. The first elastic element is pressed against the first slider, making the first slider protrusion stretch out of the first shell hole. The second elastic element is pressed against the second slider, making the second slider protrusion be located in the cavity shell. The first slider protrusion is in clearance fit with the first shell hole, and the second slider protrusion is in clearance fit with the second shell hole. The first slider and second slider are longitudinally placed in succession in the cavity shell. This limiting plate control device comprises extrusion mechanism which comprises the first extrusion part and second extrusion part connecting with the sliding pressing block. The extrusion mechanism is used to achieve that: when pushing down the sliding pressing block, the first extrusion part squeezes the first slider, making the first slider protrusion retract back into the cavity shell, and the second extrusion part doesn't squeeze the second slider and continue pushing down the sliding pressing block to make the second extrusion part squeeze the second slider, making the second slider protrusion retract back into the cavity shell.

Optionally, the sliding pressing block comprises a sliding element composed by the first connector and second connector. The sliding element is of the shape of N. The number of the first extrusion part is two, and that of the second extrusion part is two as well. One first extrusion part and one second extrusion part are successively set up in the inner side surface of the first connector, and the other first extrusion part and the other second extrusion part are successively set up in the inner side surface of the second connector. The first shell is provided with the first split groove, and the second shell is provided with the first split chamber. The first split groove and first split chamber are fastened, composing the first slider limiting slot. The mentioned first shell hole is located in the first split groove; the first shell is provided with the second split groove, and the second shell is provided with the second split chamber. The second split groove and second chamber are fastened, composing the second slider limiting slot. The second shell hole is located within the second split chamber; the first slider limiting slot and second slider limiting slot are all located within the open space of the sliding element.

Optionally, the first slider is provided with two first slopes, and the second slider is provided with two second slopes. Two extrusion parts are respectively provided with the first inclined surfaces used to coordinate respectively with the two first slopes. Two second extrusion parts are respectively provided with the second inclined surfaces used to coordinate respectively with the two second slopes.

Optionally, the first elastic element is the first spring, and the second elastic element is the second spring. The sliding pressing block is provided with the extending part connected with the sliding element, which is provided with longitudinal chute. The inner surface of the end part of the cavity shell is equipped with the transverse chute. This limiting plate control device also comprises the steel ball and the third spring. The extending part sticks out of the end part of the cavity shell. The steel ball and third spring are all located in the transverse chute. The third spring squeezes the steel ball into the longitudinal chute, and the steel ball can roll within the longitudinal chute and transverse chute.

The present disclosure also provide a kind of scooter luggage equipped with the limiting plate control mechanism, including the link rod, limiting plate, scooter body, luggage. The scooter body comprises the slide plate and frame that connect with each other, and are able to open and fold. The luggage is installed on the frame; the link rod is connected with the sliding pressing block. The scooter frame comprises the tie rod inner tube, tie rod exterior tube, tie line and tension sheet. The cavity shell and link rod are all located in the tie rod inner tube. The link rod can move within the tie rod inner tube. The cavity shell is fixed into the tie rod inner tube which is provided with the tie rod inner tube hole. The first slider protrusion sticks out of the tie rod inner tube hole. The tie rod inner tube is located in the tie rod exterior tube, which can move in the tie rod exterior tube. The tie rod exterior tube is provided with several tie rod exterior tube holes where the first slider protrusions can stretched out. The tension sheet is located in the tie rod exterior tube, which can move within the tie rod exterior tube. It is also provided with the tension sheet hole in which the second slider protrusion can be embedded. One end of the tie line is connected with the tension sheet, and the other end of it is connected with the limiting plate used to limit the folding and unfolding of the slide plate and frame.

Optionally, the slide plate comprises a front axle, front wheel, front fork, peddle support, rear wheel, fork crown cover. The fork crown cover is rotationally fixed to the angle head. The front fork is connected with the front axle; the fork crown cover is rotationally connected with the front fork; the angle head is provided with connection sheet which is connected with the front axle. There are two front wheels which are respectively installed on both ends of the front axle. The front end of the peddle support is connected with the fork crown cover; the tail end of the peddle support is equipped with the rear wheel.

Optionally, the front axle is provided with the first guide wheel and second guide wheel. The fork crown cover is provided with the first supporting inclined surface and second supporting inclined surface. The front fork is located between the first guide wheel and second guide wheel; the first guide wheel is contacted with the first supporting inclined surface, and the second guide wheel is contacted with the second supporting inclined surface.

The simple control mechanism and easy operation of the limiting plate brings convenience to the user. The present scooter luggage has a simple structure, and is easy to operate and fold.

According to another aspect of the present disclosure, a kind of button shell is provided, including a split frame which is provided with the first baffle and second baffle. The first baffle is provided with the limiting protrusion, and the second baffle is provided with the limiting slot. The there is a clearance between the first baffle and second baffle. The split frame comprises the first split frame and second split frame. The first split frame has the same structure with the second split frame; the limiting protrusion of the first split frame is embedded into the limiting slot of the second split frame, forming the first supporting plate; the limiting protrusion of the second split frame is embedded into the limiting slot of the first split frame, forming the second supporting plate. The button shell comprises the spatial accommodation constituted by the clearance between the first supporting plate and second supporting plate, which is provided with button limiting slot.

Optionally, the first baffle and second baffle of the split frame are equipped with button limiting slots. The split frame is provided with the third baffle. The first baffle and second baffle are respectively connected with the third baffle which is equipped with the baffle hole.

The present disclosure also provides a kind of scooter luggage with the button shell, including the second button which comprises the arc connector and embedded bolt part interlinked with the arc connector. The inner surface of the arc connector is provided with the limiting bump. The embedded bolt part is located in the space, which can slide up and down within this space. The limiting bump is located in the button limiting slot.

Optionally, the luggage also comprises a limiting plate control mechanism which includes the first shell, second shell, sliding body, first contact body, second contact body, flexible joint. The first shell 101 and second shell 102 combine into the cavity shell. The sliding body, first contact body and second contact body are all located in the cavity shell. The sliding body can slide in the cavity shell. The first contact body connects with the sliding body. The second contact body connects with the inner surface of the cavity shell; the flexible joint bypasses the first contact body and second contact body, and two ends of the flexible joint stretch out of the cavity shell; when the cavity shell moves along the flexible joint, the displacement of the flexible joint does not be caused; when the first contact body sliding compresses the flexible joint, one end of the flexible joint will retract inward the cavity shell.

Optionally, the first contact body is the first pulley, and the second connect body is the second pulley. The flexible joint is wire rope. The first pulley is set on the sliding body, and the first pulley can make fixed-point rotation on the sliding body. The second pulley is set on the inner surface of the cavity shell, and the second pulley can make fixed-point rotation on the inner surface of the cavity shell.

Optionally, this limiting plate control mechanism also comprises a sliding body spring which can reset the sliding body, one end of the sliding body spring is pressed against the sliding body, and the other end of the sliding body spring is pressed against the inner surface of the cavity shell. The end part of the flexible joint penetrates into one end of the cavity shell, bypasses the bottom of the first contact body and the top of the second contact body in succession, and penetrates out of the other end of the cavity shell.

Optionally, this scooter luggage comprises the first link rod, limiting plate, scooter body, luggage; the scooter body comprises the slide plate and frame that connect with each other, and are able to open and fold. The luggage is installed on the frame; the first link rod connects with the sliding body; one end of the flexible joint connects with the limiting plate; the other end of the flexible body connects with the frame; the limiting plate is used to limit the folding and unfolding of the slide plate and frame.

Optionally, this scooter luggage also comprises a slider. The slider is provided with convex column. The slider is located in the cavity shell; the cavity shell is provided with the hole allowing the convex column to extend and retract; the slider is located in the cavity shell. This scooter luggage also comprises the driving mechanism allowing the slider to transversely slide in the cavity shell. This scooter luggage also comprises the second link rod. The driving mechanism comprises the pressing block, slider spring. The slider groove is set on the inner surface of the cavity shell; the slider is located in the slider groove; the slider spring is located between the slider and the inner surface of the slider groove, and the slider spring is contacted respectively with the slider and inner surface of the slider groove; the convex column sticks out of the hole; the second link rod is connected with the pressing block; the pressing block is located in the cavity shell, and the pressing block is able to longitudinally slide along the cavity shell. The pressing block is provided with pressing block inclined surface; the slider is provided with slide inclined surface; the pressing block inclined surface is pressed above the inclined surface of the slider.

Optionally, the scooter frame comprises a tie rod inner tube, tie rod exterior tube, angle seat, handle, first button, second button, limiting plate spring. The cavity shell, first link rod and second link rod are all located in the inner tube of the tie rod; the first link rod and second link rod can move inside of the tie rod inner tube. The cavity shell is fixed to connect within the tie rod inner tube. The tie rod inner tube is provided with the tie rod inner tube hole. The convex column sticks out of the tie rod inner tube hole. The first button is connected with the first link rod, and the second button is connected with the second link rod. The second button is provided with the installation hole; the first button is located in the installation hole; the second button is installed at the end part of the of the tie rod inner tube; the handle 604 is installed on the end part of the tie rod inner tube 601; the tie rod inner tube is located inside the tie rod exterior tube, and the tie rod inner tube is able to move within the tie rod exterior tube. The tie rod exterior tube is provided with several tie rod exterior tube holes where the convex columns are stretched out. The tie rod exterior tube is connected with the angle seat, and the angle seat is provided with open slot. The limiting plate is located in the open slot; one end of the limiting plate spring is pressed against the open slot; the other end of the limiting plate spring is pressed against the root part of the limiting plate; the flexible joint is located in the tie rod inner tube; the other end of the flexible joint is fixedly connected with the tie rod exterior tube; the slide plate is provided with angle head, and the angle head forms a flexible connection with the angle seat; the angle head is provided with at least two limiting slots in which the limiting plate can be embedded.

Optionally, the slide plate comprises a front axle, front wheel, front fork, peddle support, rear wheel, fork crown cover. The fork crown cover is rotationally fixed to the angle head. The front fork is connected with the front axle; the fork crown cover is rotationally connected with the front fork; the angle head is provided with connection sheet which is connected with the front axle. There are two front wheels which are respectively installed on both ends of the front axle. The front end of the peddle support is connected with the fork crown cover; the tail end of the peddle support is equipped with the rear wheel. The front axle is provided with the first guide wheel and second guide wheel. The fork crown cover is provided with the first supporting inclined surface and second supporting inclined surface. The front fork is located between the first guide wheel and second guide wheel; the first guide wheel is contacted with the first supporting inclined surface, and the second guide wheel is contacted with the second supporting inclined surface.

The button shell provided by the present disclosure has a simple structure, and is easy to assemble and operate, which brings convenience to the user. The scooter luggage provided by the present disclosure has simple structure, and is easy to operate and fold.

According to a further aspect of the present disclosure, a kind of scooter luggage is provided, which comprises the scooter body, luggage. The scooter body includes the slide plate and scooter frame. The luggage is installed on the frame, and the slide plate is equipped with angle head. The slide plate comprises the front axle, front wheel, front fork, peddle support, rear wheel, fork crown cover. The fork crown cover is rotationally fixed to the angle head. The front fork is connected with the front axle; the fork crown cover is rotationally connected with the front fork; the angle head is provided with connection sheet which is connected with the front axle. There are two front wheels which are respectively installed on both ends of the front axle. The front end of the peddle support is connected with the fork crown cover; the tail end of the peddle support is equipped with the rear wheel.

Optionally, the slide plate comprises a front axle, front wheel, front fork, peddle support, rear wheel, fork crown cover. The fork crown cover is rotationally fixed to the angle head. The front fork is connected with the front axle; the fork crown cover is rotationally connected with the front fork; the angle head is provided with connection sheet which is connected with the front axle. There are two front wheels which are respectively installed on both ends of the front axle. The front end of the peddle support is connected with the fork crown cover; the tail end of the peddle support is equipped with the rear wheel.

Optionally, the first supporting inclined surface has the same structure with the second supporting inclined surface. The structure from the root part of the first supporting inclined surface to the end part of it is from thin to thick. The structure from the root part of the second supporting inclined surface to the end part of it is from thin to thick as well. The root part of the first supporting inclined surface is connected with the fork crown cover, and the root part of the second supporting inclined surface is connected with the fork crown cover.

Optionally, this scooter luggage also compromises a control mechanism of the limiting plate, which includes the first shell, second shell, sliding body, first contact body, second contact body, flexible joint. The first shell 101 and second shell 102 combine into the cavity shell. The sliding body, first contact body and second contact body are all located in the cavity shell. The sliding body can slide in the cavity shell. The first contact body connects with the sliding body. The second contact body connects with the inner surface of the cavity shell; the flexible joint bypasses the first contact body and second contact body, and two ends of the flexible joint stretch out of the cavity shell; when the cavity shell moves along the flexible joint, the displacement of the flexible joint does not be caused; when the first contact body sliding compresses the flexible joint, one end of the flexible joint will retract inward the cavity shell.

Optionally, the first contact body is the first pulley, and the second connect body is the second pulley. The flexible joint is wire rope. The first pulley is set on the sliding body, and the first pulley can make fixed-point rotation on the sliding body. The second pulley is set on the inner surface of the cavity shell, and the second pulley can make fixed-point rotation on the inner surface of the cavity shell.

Optionally, this limiting plate control mechanism also comprises a sliding body spring which can reset the sliding body, one end of the sliding body spring is pressed against the sliding body, and the other end of the sliding body is pressed against the inner surface of the cavity shell. The end part of the flexible joint penetrates into one end of the cavity shell, bypasses the bottom of the first contact body and the top of the second contact body in succession, and penetrates out of the other end of the cavity shell.

Optionally, this scooter luggage also comprises the first link rod, limiting plate, scooter body, luggage; the scooter body comprises the slide plate and frame that connect with each other, and are able to open and fold. The luggage is installed on the frame; the first link rod connects with the sliding body; one end of the flexible joint connects with the limiting plate; the other end of the sliding body spring flexible body connects with the frame; the limiting plate is used to limit the folding and unfolding of the slide plate and frame.

Optionally, this scooter luggage also comprises a slider. The slider is provided with convex column. The slider is located in the cavity shell; the cavity shell is provided with the hole allowing the convex column to extend and retract; the slider is located in the cavity shell. This scooter luggage also comprises the driving mechanism allowing the slider to transversely slide in the cavity shell.

Optionally, this scooter luggage also comprises the second link rod. The driving mechanism comprises the pressing block, slider spring. The slider groove is set on the inner surface of the cavity shell; the slider is located in the slider groove; the slider spring is located between the slider and the inner surface of the slider groove, and the slider spring is contacted respectively with the slider and inner surface of the slider groove; the convex column sticks out of the hole; the second link rod is connected with the pressing block; the pressing block is located in the cavity shell, and the pressing block is able to longitudinally slide along the cavity shell. The pressing block is provided with pressing block inclined surface; the slider is provided with slide inclined surface; the pressing block inclined surface is pressed above the slider inclined surface.

Optionally, the scooter frame comprises a tie rod inner tube, tie rod exterior tube, angle seat, handle, first button, second button, limiting plate spring. The cavity shell, first link rod and second link rod are all located in the inner tube of the tie rod; the first link rod and second link rod can move inside of the tie rod inner tube. The cavity shell is fixed to connect within the tie rod inner tube. The tie rod inner tube is provided with the tie rod inner tube hole. The convex column sticks out of the tie rod inner tube hole. The first button is connected with the first link rod, and the second button is connected with the second link rod. The second button is provided with the installation hole; the first button is located in the installation hole; the second button is installed at the end part of the of the tie rod inner tube; the tie rod inner tube is located inside the tie rod exterior tube, and the tie rod exterior tube is able to move within the tie rod exterior tube. The tie rod exterior tube is provided with several tie rod exterior tube holes where the convex columns are stretched out. The tie rod exterior tube is connected with the angle seat, and the angle seat is provided with open slot. The limiting plate is located in the open slot; one end of the limiting plate spring is pressed against the open slot; the other end of the sliding body spring limiting plate spring is pressed against the bottom of the limiting plate; the flexible joint is located in the tie rod inner tube; the other end of the sliding body spring flexible joint is fixedly connected with the tie rod exterior tube; the slide plate is provided with angle head, and the angle head forms a flexible connection with the angle seat; the angle head is provided with at least two limiting slots in which the limiting plate can be embedded.

The scooter luggage provided by the present disclosure is able to change directions, and easy to operate, which brings the user convenience.

BRIEF DESCRIPTION OF THE DRAWINGS

Other characteristics, purposes and advantages of the present invention will become more evident via reading the following figures describing the non-limiting embodiments.

DETAILED DESCRIPTION

Technicians in the present field should know that the present invention can be embodied by other ways detached from these specific details. Furthermore, in order not to blur the present invention, the unnecessary details of known functions and structures are omitted in the current description. The present disclosure will make a further detailed description by combining with the attached figures.

Figure 1:
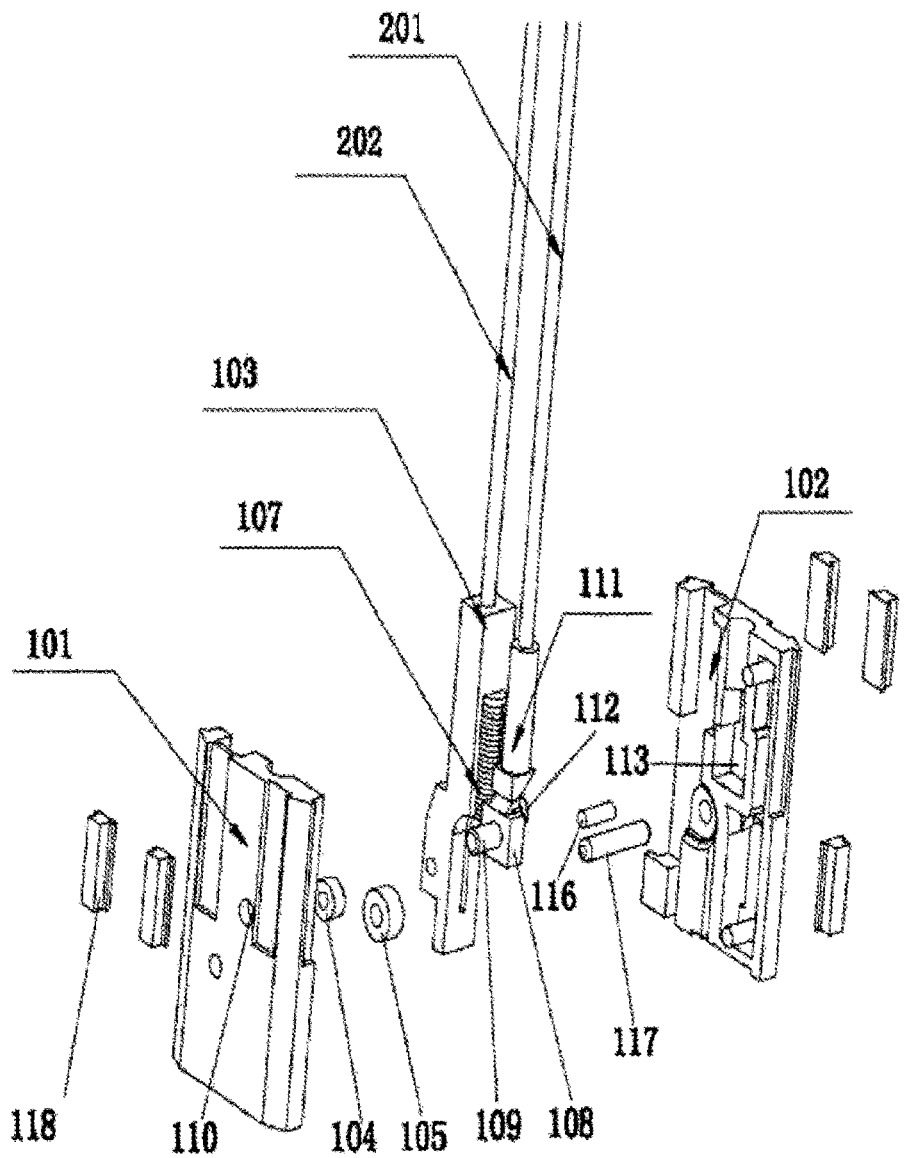
FIG. 1 is the breakdown structure diagram of the limiting plate control mechanism according to one aspect of the present disclosure, in which the limiting plate is not installed.
Figure 2:
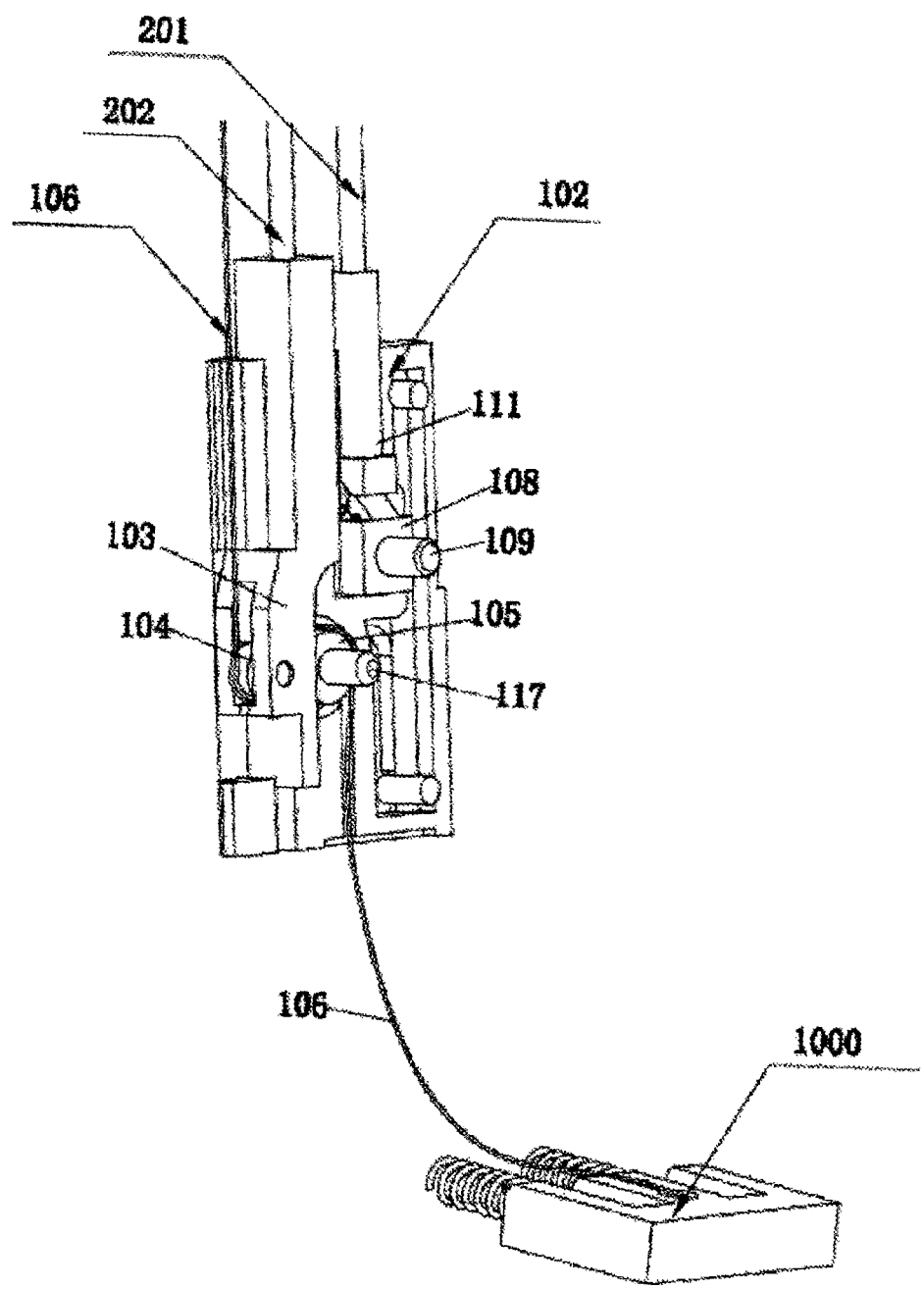
FIG. 2 is the breakdown structure diagram of the limiting plate control mechanism according to one aspect of the present disclosure, in which the limiting plate is installed.
Figure 3:
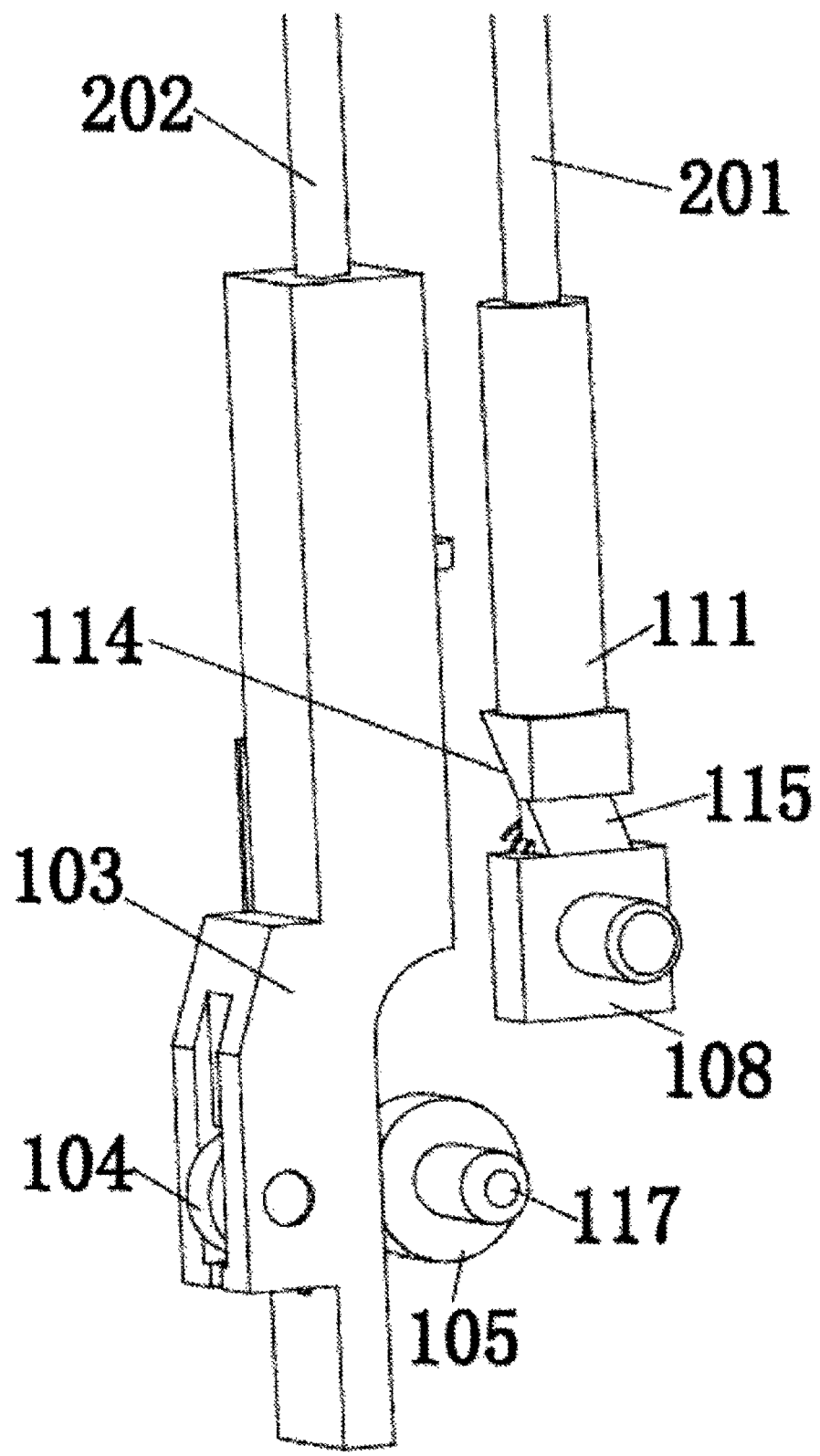
FIG. 3 is the breakdown structure diagram of the limiting plate control mechanism according to one aspect of the present disclosure, in which the limiting plate and wire rope are not installed.
Figure 4:
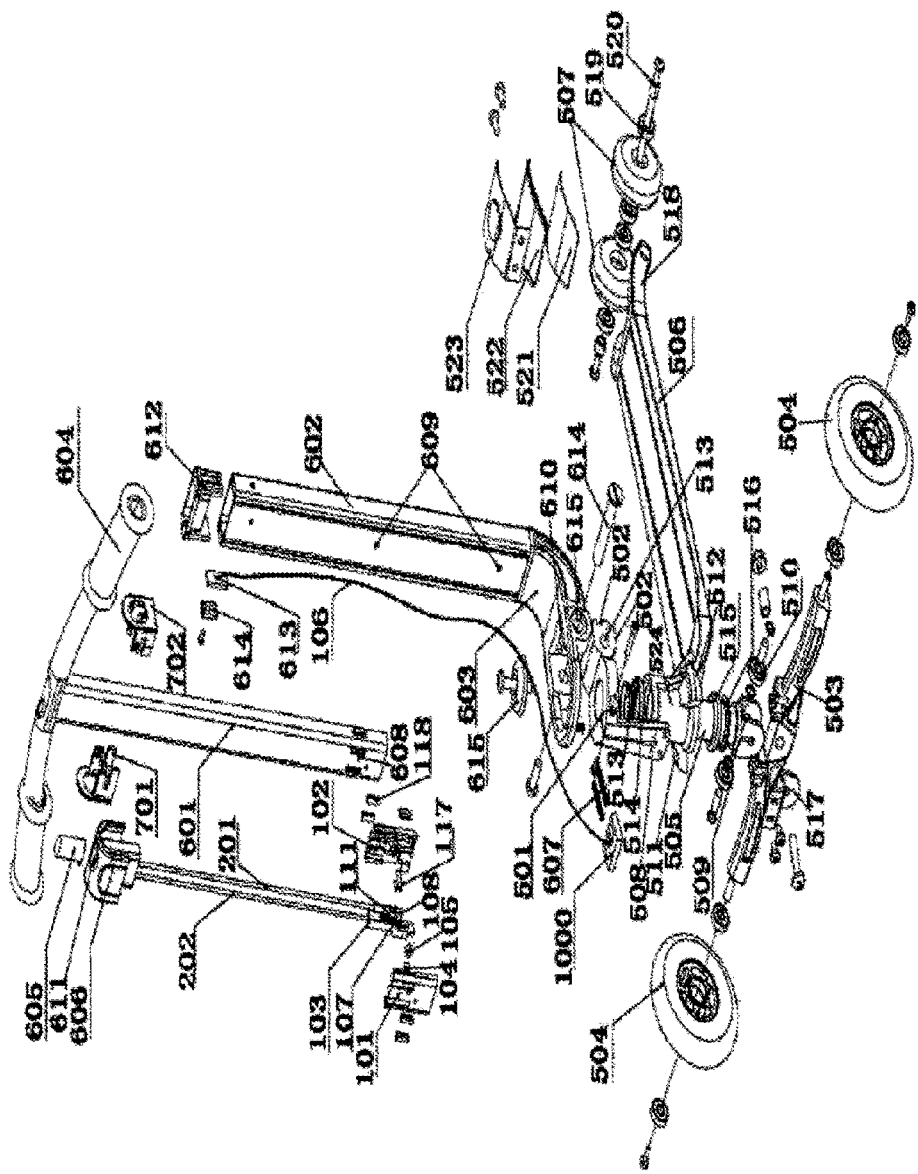
FIG. 4 is the breakdown structure diagram of the scooter luggage according to one aspect of the present disclosure.
Figure 5:
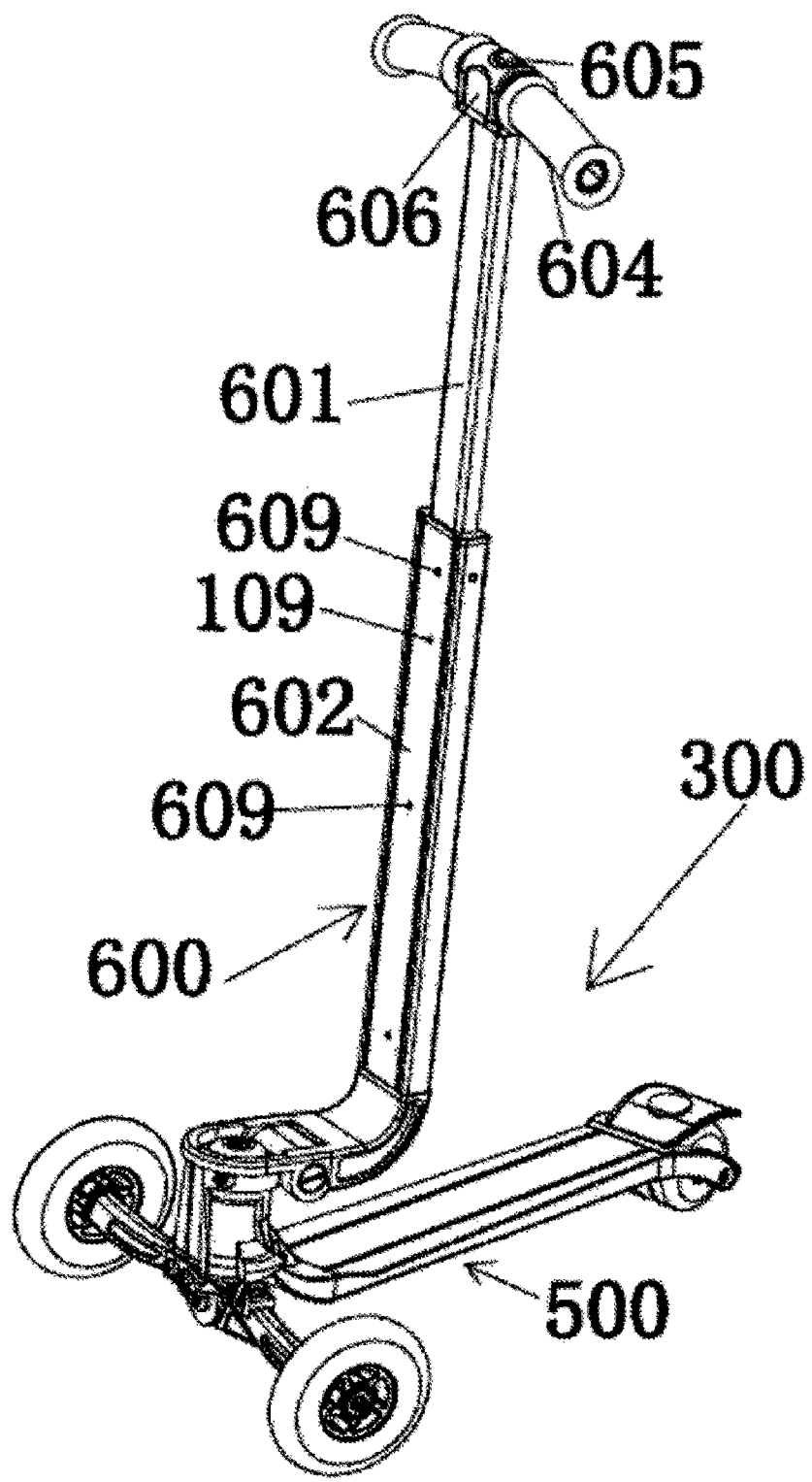
FIG. 5 is the breakdown structure diagram of the scooter luggage according to one aspect of the present disclosure, in which the luggage is not installed.
Figure 6:
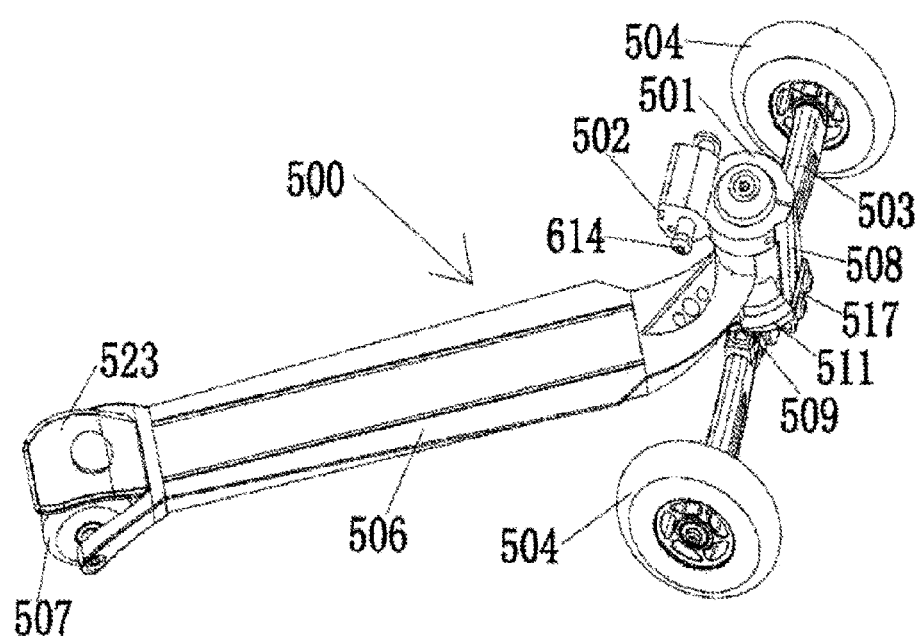
FIG. 6 is the structure diagram of the slide plate according to one aspect of the present disclosure.
Figure 7:
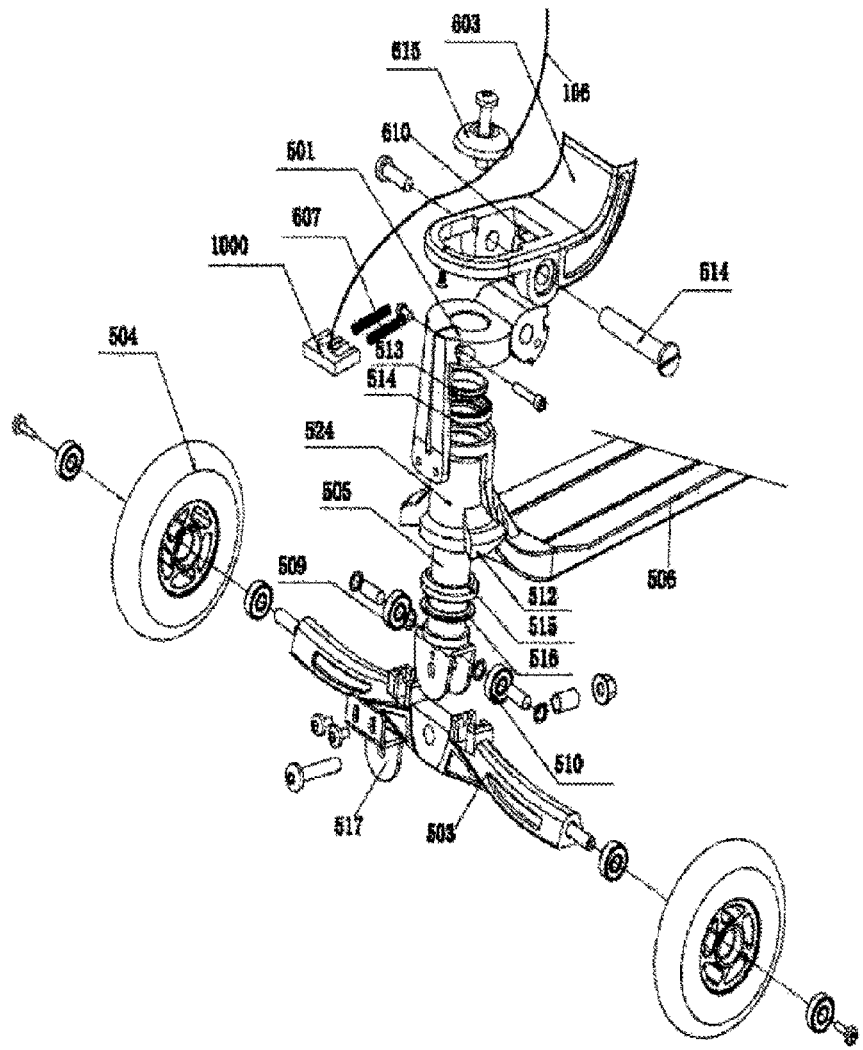
FIG. 7 is the breakdown structure diagram of the slide plate according to one aspect of the present disclosure.
Figure 8:
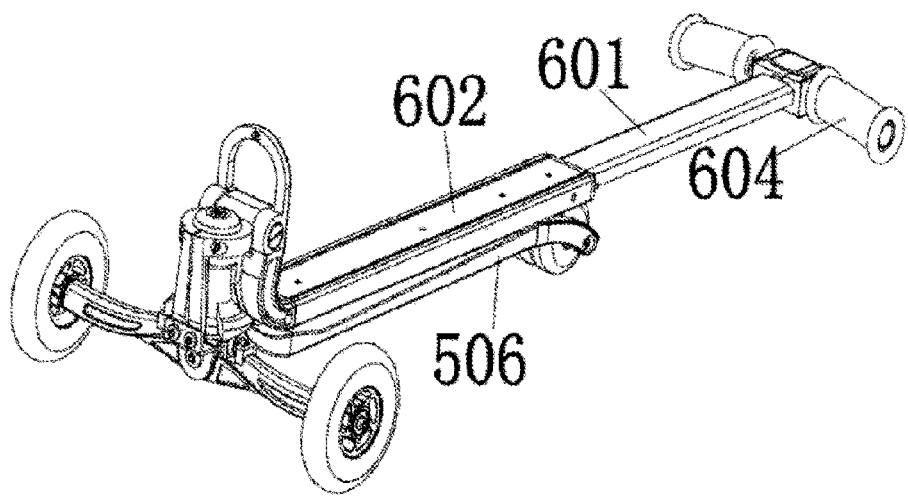
FIG. 8 is the folding structure diagram of the scooter luggage according to one aspect of the present disclosure, in which the luggage is not installed.

As illustrated in FIG. 1 to FIG. 3, the present disclosure provides a kind of limiting plate control mechanism which comprises the first shell 101, second shell 102, sliding body 103, first contact body, second contact body, flexible joint. The first shell 101 and second shell 102 combine into the cavity shell. The sliding body 103, first contact body and second contact body are all located in the cavity shell. The sliding body 103 can slide in the cavity shell. The first contact body connects with the sliding body 103. The second contact body connects with the inner surface of the cavity shell; the flexible joint bypasses the first contact body and second contact body, and two ends of the flexible joint stretch out of the cavity shell; when the cavity shell moves along the flexible joint, the displacement of the flexible joint does not be caused; when the first contact body sliding compresses the flexible joint, one end of the flexible joint will retract inward the cavity shell.

Optionally, the first contact body is the first pulley 104, and the second connect body is the second pulley 105. The flexible joint is the wire rope 106. The first pulley 104 is set on the sliding body 103, and the first pulley 104 can make fixed-point rotation on the sliding body 103. The second pulley 105 is set on the inner surface of the cavity shell, and the second pulley 105 can make fixed-point rotation on the inner surface of the cavity shell.

As an embodiment, this limiting plate control mechanism also includes the first pulley core 116 and second pulley core 117. This first pulley core is installed on the sliding body 103, and the first pulley 104 is sheathed on the first pulley core 116 to rotate. The second pulley core 117 is installed on the inner surface of the cavity shell, and the second pulley 105 is sheathed the second pulley core 117 to rotate.

This limiting plate control mechanism also comprises a sliding body spring 107 which can reset the sliding body 103. One end of the sliding body spring is pressed against the sliding body 103, and the other end of the sliding body spring 107 is pressed against the inner surface of the cavity shell.

The end part of the wire rope 106 penetrates into one end of the cavity shell, bypasses the bottom of the first pulley 104 and the top of the second pulley 105 in succession, and penetrates out of the other end of the cavity shell.

The plastic bar 118 is installed on the exterior surface of the cavity shell.

As illustrated in FIG. 4 to FIG. 8, FIG. 15 to FIG. 23, the present disclosure also provide a kind of scooter luggage equipped with the limiting plate control mechanism, including the first link rod 201, limiting plate 1000, scooter body 300, luggage 400; the scooter body 300 comprises the slide plate 500 and scooter frame 600 that connect with each other, and are able to open and fold. The luggage 400 is installed on the frame 600; the first link rod 201 connects with the sliding body 103; one end of the flexible joint connects with the limiting plate 1000; the other end of the sliding body spring flexible body connects with the frame 600; the limiting plate 1000 is used to limit the folding and unfolding of the slide plate 500 and frame 600.

This scooter luggage also comprises a slider 108. The slider 108 is provided with convex column 109. The slider 108 is located in the cavity shell; the cavity shell is provided with Hole 110 allowing the convex column 109 to extend and retract; the slider 108 is located in the cavity shell. This scooter luggage also comprises the driving mechanism allowing the slider 108 to transversely slide in the cavity shell. The transverse direction is the direction from the first shell 101 to the second shell 102.

This scooter luggage also comprises the second link 202 rod. The driving mechanism comprises the pressing block 111, slider spring 112. The slider groove 113 is set on the inner surface of the cavity shell; the slider 108 is located in the slider groove 113; the slider spring 112 is located between the slider 108 and the inner surface of the slider groove 113, and the slider spring 112 is contacted respectively with the slider 108 and inner surface of the slider groove 113; the convex column 109 sticks out of the hole 110; the second link rod 202 is connected with the pressing block 111; the pressing block 111 is located in the cavity shell, and the pressing block 111 is able to longitudinally slide along the cavity shell. The pressing block 111 is provided with pressing block inclined surface 114; the slider 108 is provided with slide inclined surface 115; the pressing block inclined surface 114 is pressed above the slider inclined surface 115.

This slider spring 112 gives a constant elastic force to slider 108, thereby making convex column 109 on slider 108 stretch out of hole 110. Pressing block 111 slides down and squeezes slider 108, which makes slider 108 retract inward the cavity shell, thereby making convex 109 retract back into the cavity shell.

The frame 600 comprises the tie rod inner tube 601, tie rod exterior tube 602, angle seat 603, handle 604, first button 605, second button 606, and limiting plate spring 607. The cavity shell, first link rod 201 and second link rod 202 are all located in the tie rod inner tube 601; the first link rod 201 and second link rod 202 can move inside of the tie rod inner tube 601. The cavity shell is fixed to connect within the tie rod inner tube 601. The tie rod inner tube 601 is provided with the tie rod inner tube hole 608. The convex column 109 sticks out of the tie rod inner tube hole 608. The first button 605 is connected with the first link rod 201, and the second button 606 is connected with the second link rod 202. The second button 606 is provided with the installation hole 611; the first button 605 is located in the installation hole 611; the second button 606 is installed at the end part of the of the tie rod inner tube 601; the handle 604 is installed on the end part of the tie rod inner tube 601; the tie rod inner tube 601 is located inside the tie rod exterior tube 602, and the tie rod inner tube 601 is able to move within the tie rod exterior tube 602. The tie rod exterior tube 602 is provided with several tie rod exterior tube hole 609s where the convex column 109s are stretched out. The tie rod exterior tube 602 is connected with the angle seat 603, and the angle seat 603 is provided with open slot 610. The limiting plate 1000 is located in the open slot 610; one end of the limiting plate spring 607 is pressed against the open slot 601; the other end of the limiting plate spring 607 is pressed against the root part of the limiting plate 1000; the wire rope 106 is located in the tie rod inner tube 601; the other end of wire rope 106 is fixedly connected with the tie rod exterior tube 602; the slide plate 500 is provided with angle head 501, and the angle head 501 forms a flexible connection with the angle seat 603; the angle head 501 is provided with at least two limiting slot 502s in which the limiting plate 1000 can be embedded.

The tie rod plug 612 is installed on the end part of the tie rod exterior tube 602, which is located within the tie rod exterior tube 602. The other end of the wire rope 196 is fixed to the second wire rope fixing flap 613. The second wire rope fixing flap 613 is fixed on the tie rod exterior tube 602 via the first wire rope fixing flap 614.

The angle seat 603 is provided with angle seat hole 615. The angle head 501 is provided with angle head hole 513. The angle seat hole 615 is aligned with angle head hole 513. The large bolt 614 penetrates into the angle head hole 513 and angle seat hole 615, making angle seat 603 to rotate around the large bolt 614 as the axis so as to enable the tie rod exterior tube 602 and peddle support 506 to open or fold together. The lock cover 615 is fastened on the angle head 501.

The slide plate 500 comprises the front axle 503, front wheel 504, front fork 505, peddle support 506, rear wheel 507, fork crown cover 524. The fork crown cover 524 is rotationally fixed to the angle head 501. The front fork 505 is connected with the front axle 503; the fork crown cover 524 is rotationally connected with the front fork; the angle head 501 is provided with connection sheet 508 which is connected with the front axle 503. There are two front wheel 504s which are respectively installed on both ends of the front axle 503. The front end of the peddle support 506 is connected with the fork crown cover 524; the tail end of the peddle support 506 is equipped with the rear wheel 507.

Upper gasket 513 and upper bearing 514 are installed between the fork crown cover 524 and angle head 501, thereby achieving the rotating connection of the fork crown cover 524 with the angle head 501. Lower gasket 515 and lower bearing 516 are installed between the fork crown cover 524 and front fork 505, thereby achieving the rotating connection of the fork crown cover 524 with the front fork 505. Therefore the purpose of making the fork crown cover 524 to change directions can be achieved.

The front fork 505 and connector 508 are fixed on the front fork 505 by front fork limiting part 517. The tail end of the peddle support 506 is equipped with rear wheel fork 518, on which the rear wheel 507 is installed by bearing 519 and small bolt 520.

This scooter luggage also includes braking mechanism which is used to accomplish the brake of the rear wheel 507. The braking mechanism is consisted of the brake block 521, rubber pad 522 and brake cover 523.

The front axle 503 is provided with the first guide wheel 509 and second guide wheel 510. The fork crown cover 524 is provided with the first supporting inclined surface 511 and second supporting inclined surface 512. The front fork 505 is located between the first guide wheel 509 and the second guide wheel 510; the first guide wheel 509 is contacted with the first supporting inclined surface 511, and the second guide wheel 510 is contacted with the second supporting inclined surface 512.

The first supporting inclined surface 511 has the same structure with the second supporting inclined surface 512. The structure from the root part of the first supporting inclined surface 511 to the end part of it is from thin to thick. The structure from the root part of the second supporting inclined surface 512 to the end part of it is from thin to thick as well. The root part of the first supporting inclined surface 511 is connected with the fork crown cover 524, and the root part of the second supporting inclined surface 512 is connected with the fork crown cover 524.

As the slide plate 500 steers, the steering will be effected due to the existence of the luggage 400. For example, when it steers left, the luggage will be offset to the right, which affects the user to turn left. In order to solve this problem, according to an embodiment, the structures of the first guide wheel 509, second guide wheel 510, first supporting inclined surface 511 and second supporting inclined surface 512 have been designed.

Figure 9:
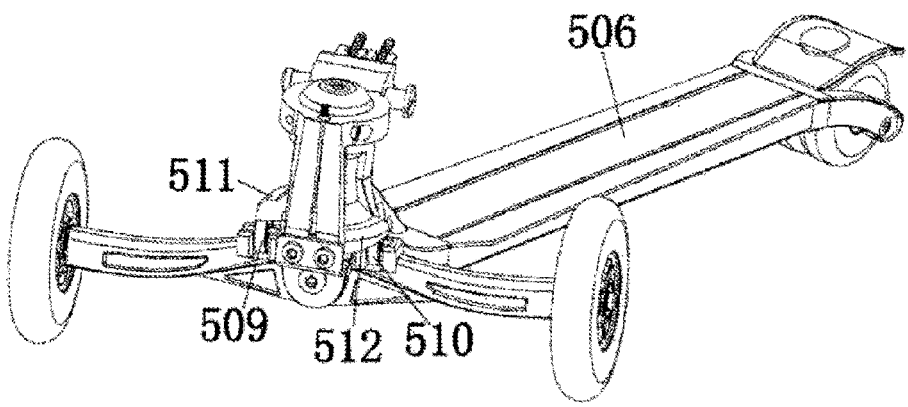
FIG. 9 is the left-turning structure diagram of the slide plate according to one aspect of the present disclosure.
Figure 10:
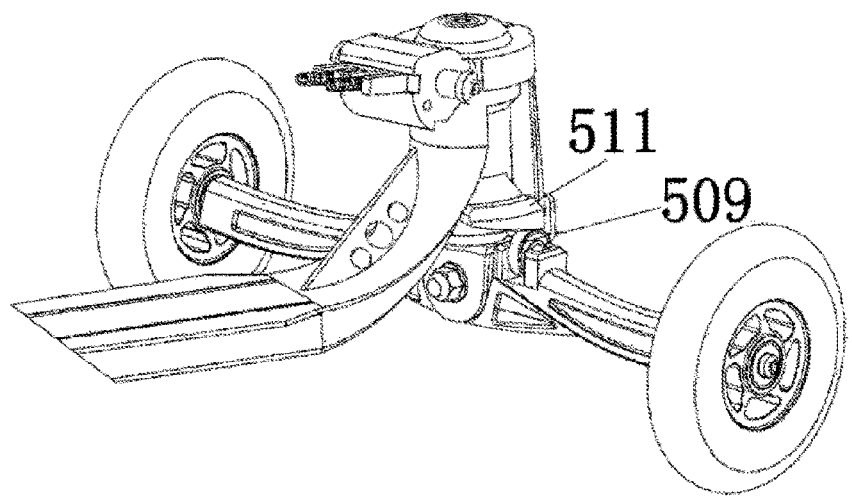
FIG. 10 is the right-side structure diagram of the slide plate in FIG. 9 when it turns left.
Figure 11:
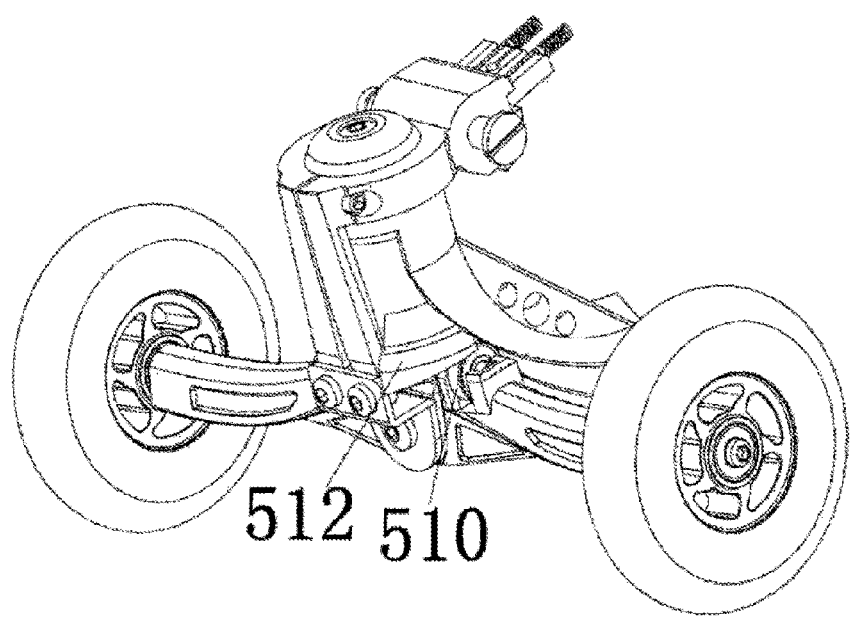
FIG. 11 is the left-side structure diagram of the slide plate in FIG. 9 when it turns left.

As illustrated in FIG. 9 to FIG. 11, when the scooter luggage turns left, the first guide wheel 509 contacts with the thick surface of the first supporting inclined surface 511, and the second guide wheel 510 contacts with the thin surface of the second supporting inclined surface 512, thereby making the center of gravity of the slide plate 500 incline to the left, which can help the scooter luggage turn left.

Figure 12:
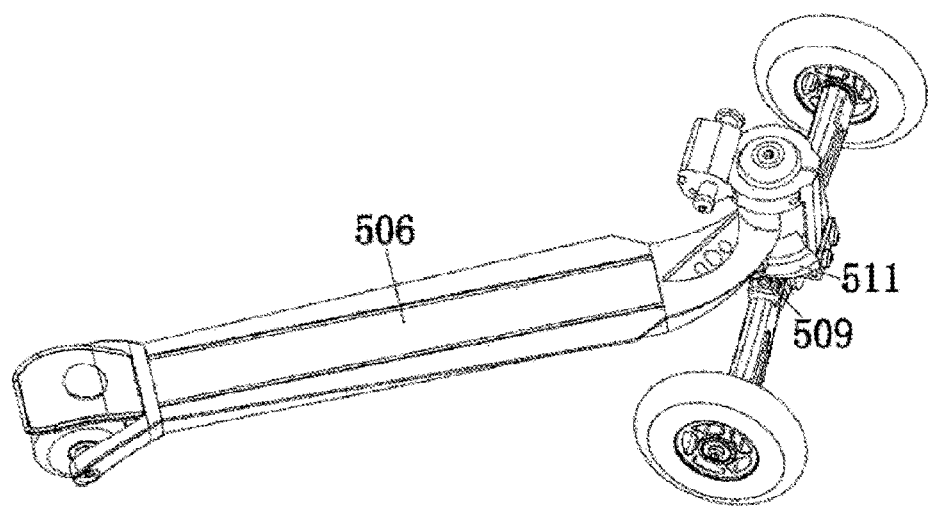
FIG. 12 is the right-turning structure diagram of the slide plate according to one aspect of the present disclosure.
Figure 13:
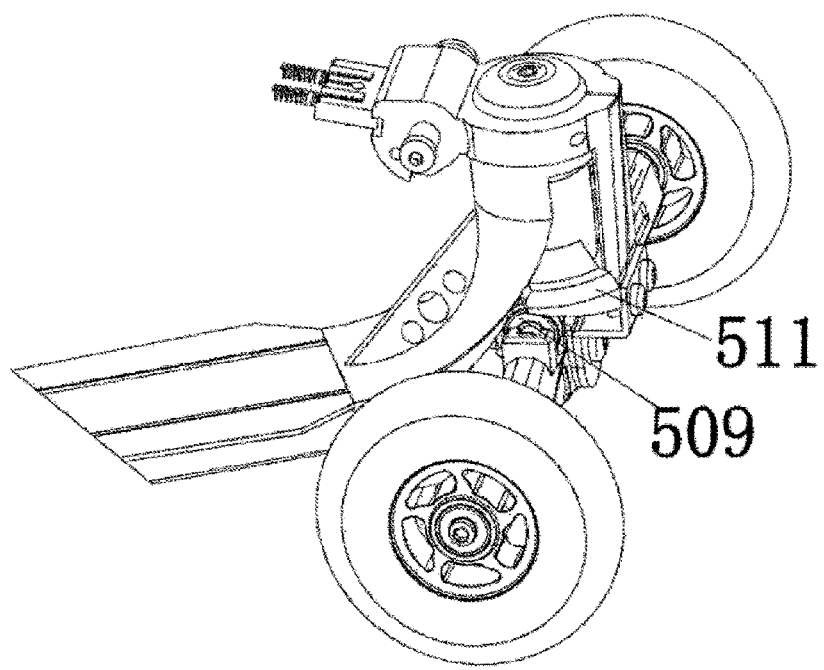
FIG. 13 is the right-side structure diagram of the slide plate in FIG. 9 when it turns right.
Figure 14:
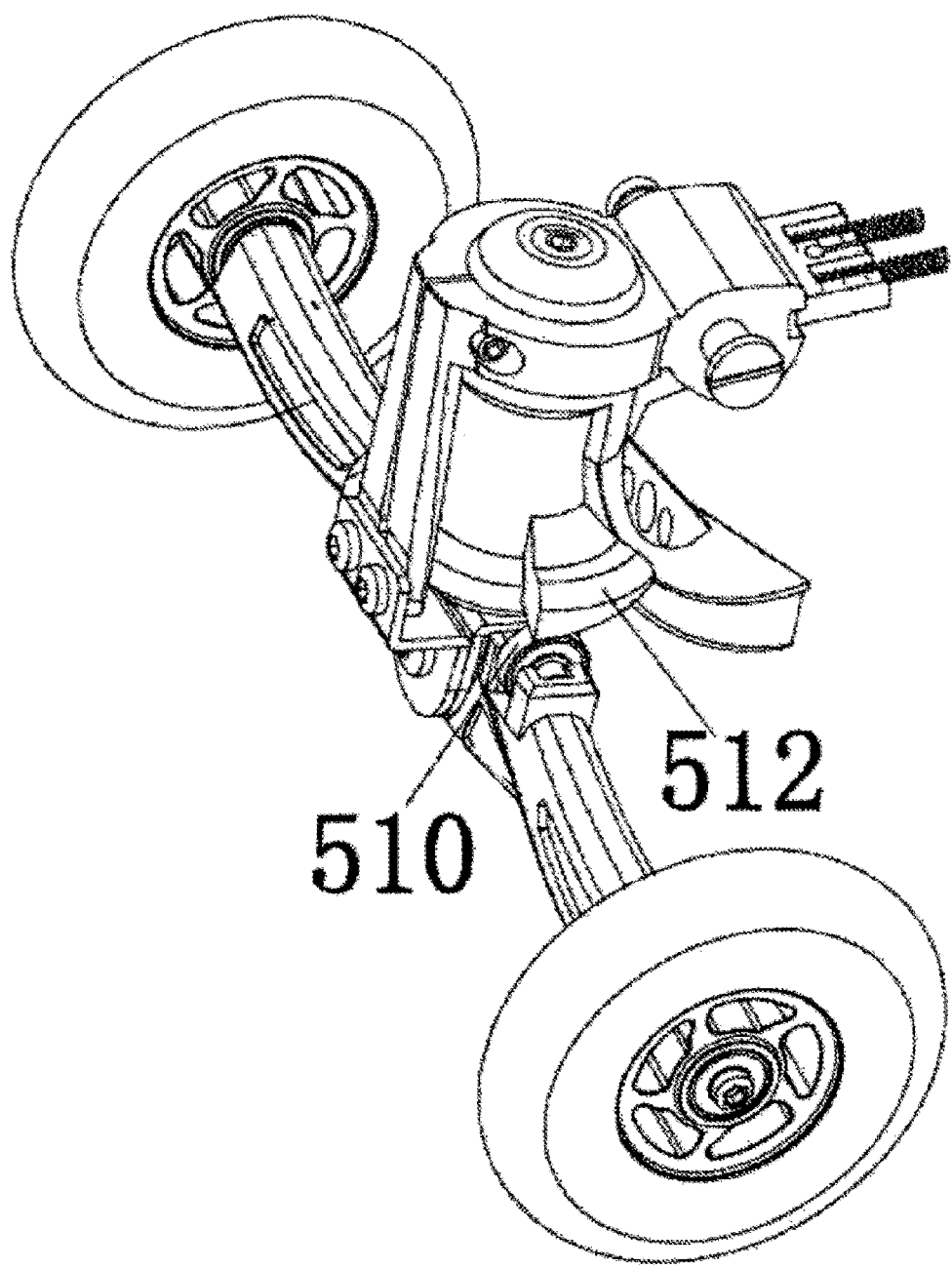
FIG. 14 is the left-side structure diagram of the slide plate in FIG. 9 when it turns right.
Figure 15:
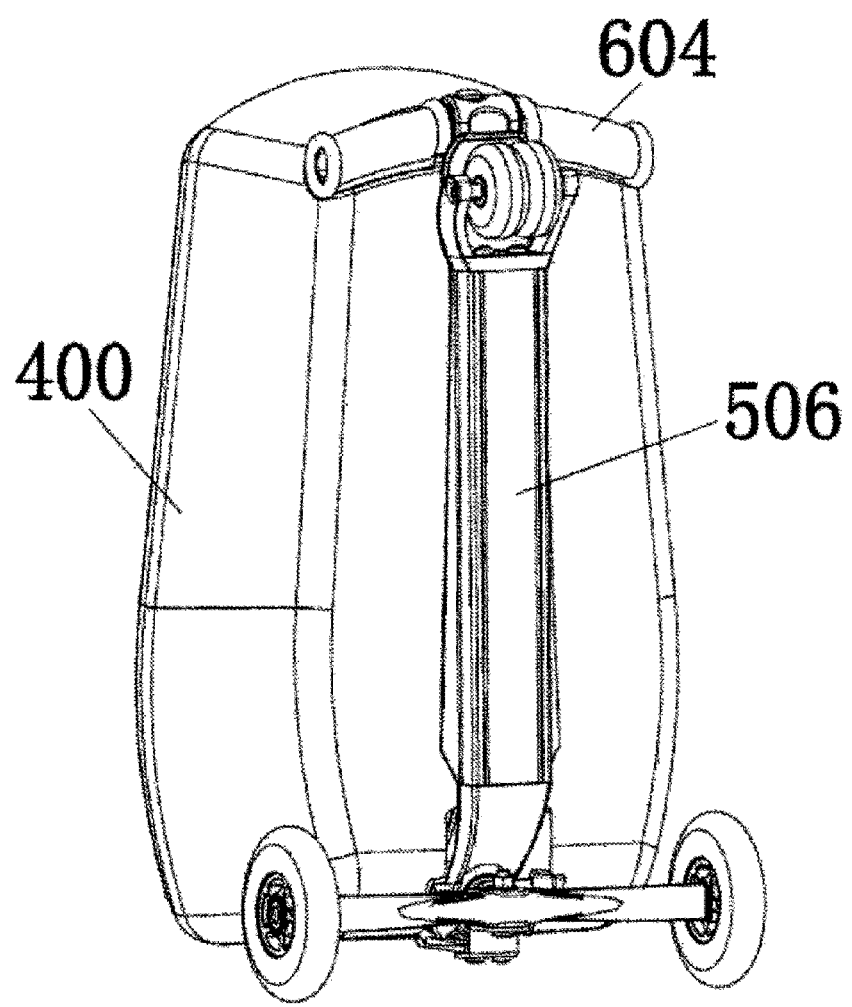
FIG. 15 is the first service state structure diagram of the scooter luggage according to one aspect of the present disclosure.
Figure 16:
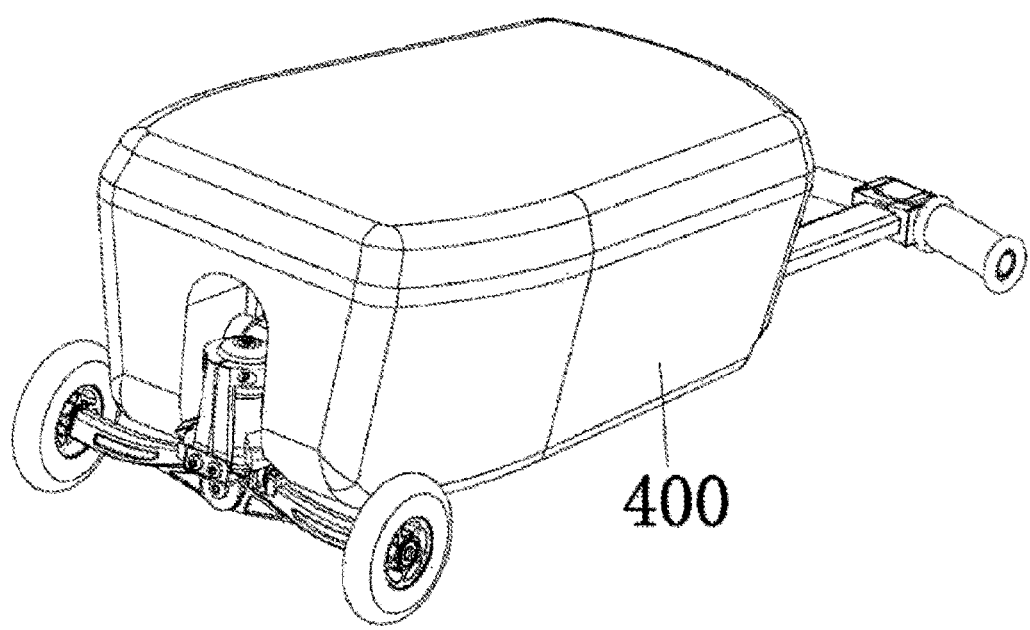
FIG. 16 is the second service state structure diagram of the scooter luggage according to one aspect of the present disclosure.
Figure 17:
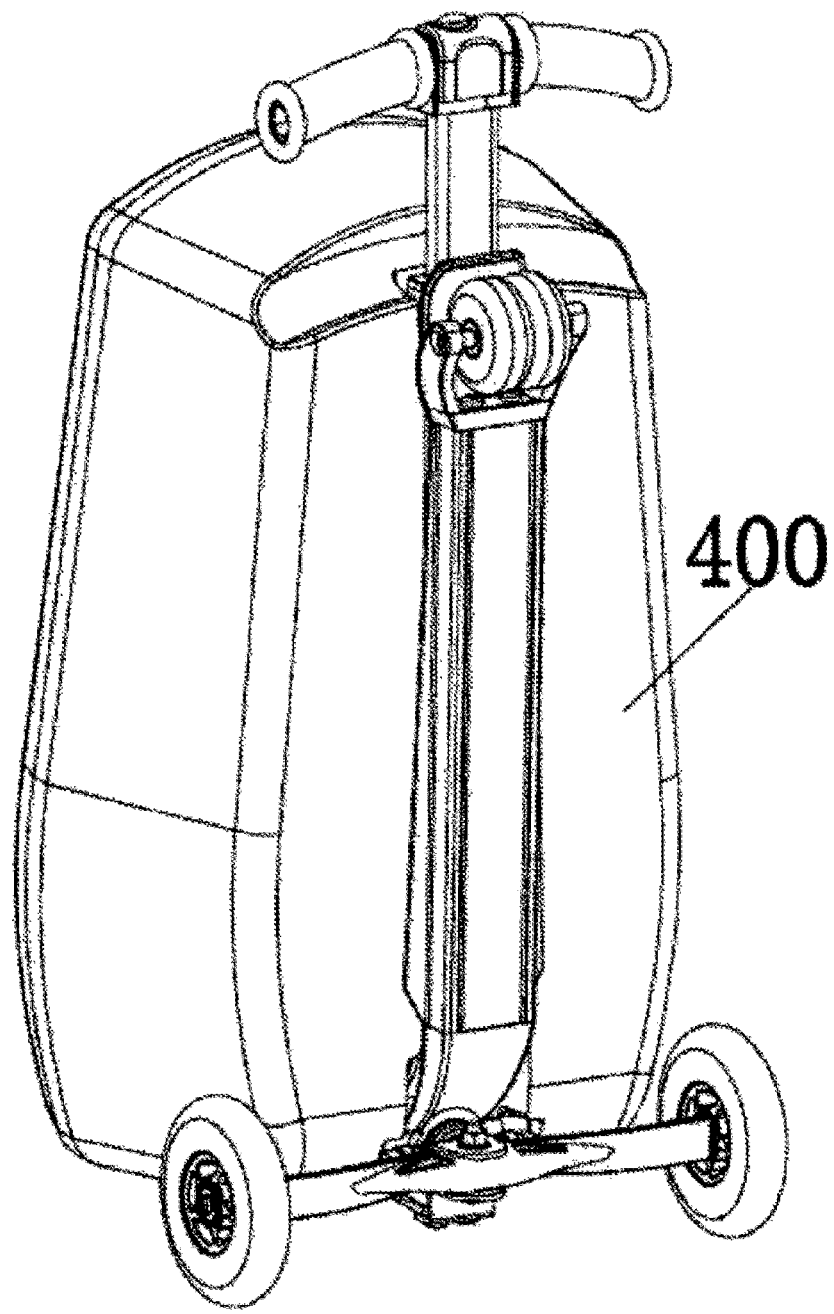
FIG. 17 is the third service state structure diagram of the scooter luggage according to one aspect of the present disclosure.
Figure 18:
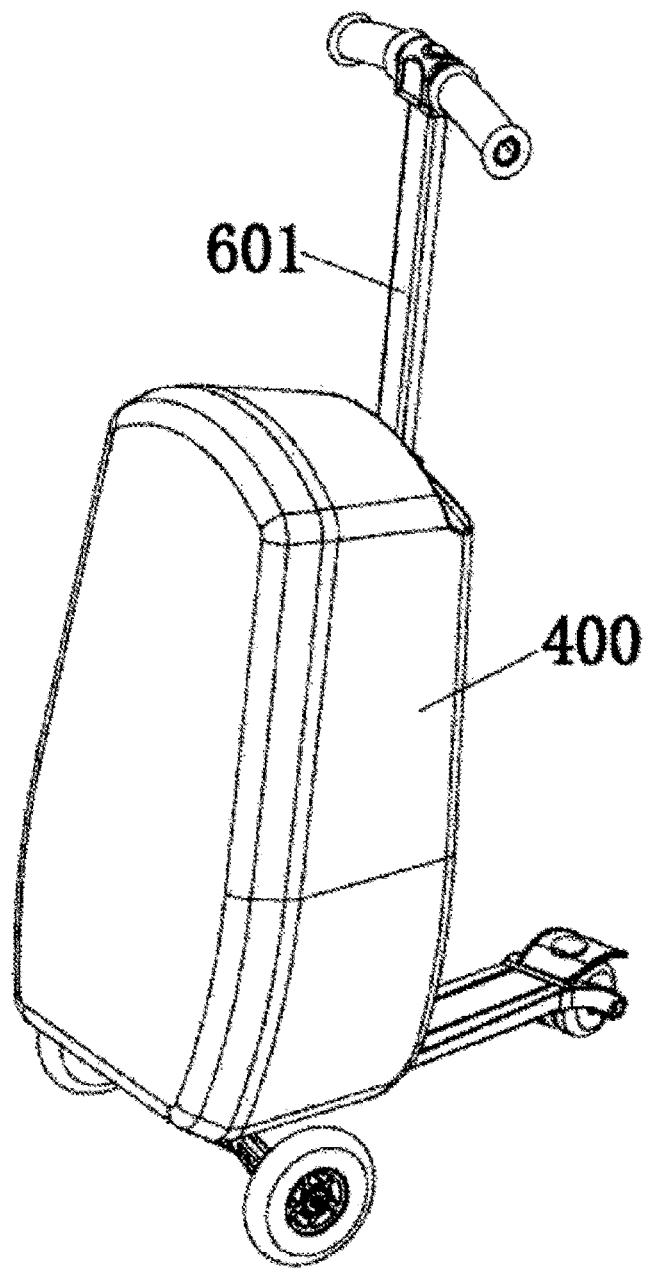
FIG. 18 is the fourth service state structure diagram of the scooter luggage according to one aspect of the present disclosure.
Figure 19:
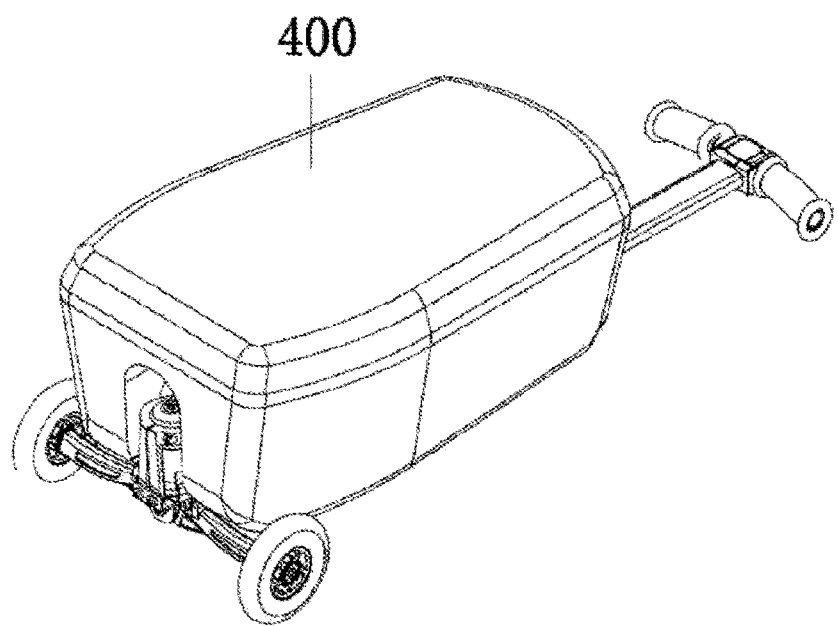
FIG. 19 is the fifth service state structure diagram of the scooter luggage according to one aspect of the present disclosure.
Figure 20:
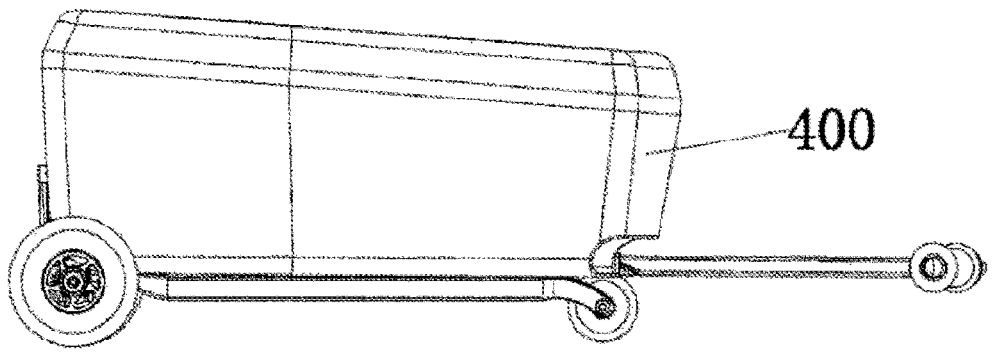
FIG. 20 is the sixth service state structure diagram of the scooter luggage according to one aspect of the present disclosure.
Figure 21:
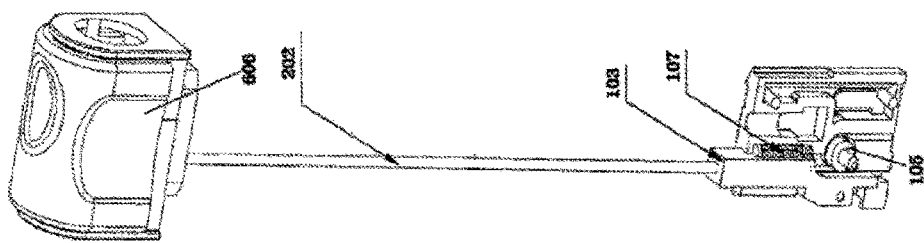
FIG. 21 is the front structure diagram of the second button and second link rod according to one aspect of the present disclosure.
Figure 22:
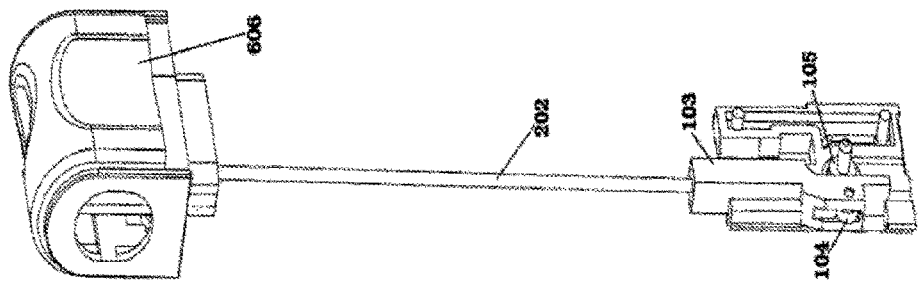
FIG. 22 is the side structure diagram of the second button and second link rod according to one aspect of the present disclosure.
Figure 23:
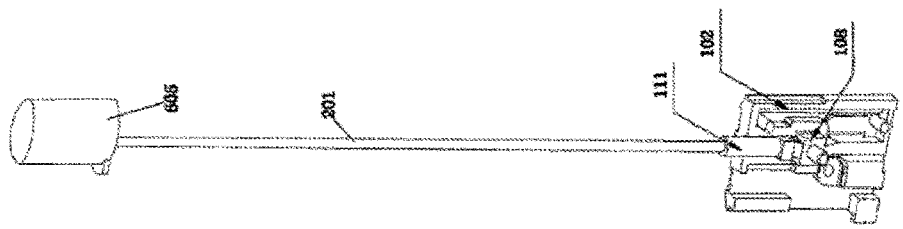
FIG. 23 is the front structure diagram of the first button and first link rod according to one aspect of the present disclosure.

As illustrated in FIG. 12 to FIG. 14, when the scooter luggage turns right, the first guide wheel 509 contacts with the thin surface of the first supporting inclined surface 511, and the second guide wheel 510 contacts with the thick surface of the second supporting inclined surface 512, thereby making the center of gravity of the slide plate 500 incline to the right, which can help the scooter luggage turn right.

According to an embodiment, the first button shell 701 and the second button shell 702 are also included. The first button shell 701 and the second button shell 702 are consisted of button shell which is sheathed on the end of the tie rod inner tube 601. The second button 606 is installed in the button shell, and it can slide within the button shell.

When used, the scooter luggage is able to change directions. When the first button 605 is pushed, the pressing block 111 presses the slider 108, and thereby make the convex column 109 retract back into the cavity shell, so the inner tube of the expansion tie rod can be pulled. When the first button 605 is released, the convex column 109 sticks out of the hole 110 again in the function of the slider spring 112. Meanwhile, the convex column 109 sticks out of the tie rod inner tube hole 608, and it inserts into the tie rod exterior tube 609 to fix position. When the tie rod inner tube 601 is pulled to move in the tie rod exterior tube 602, the wire rope 106 has no displacement. The cavity shell slide up and down along the wire rope 106, and the first pulley 104 and the second pulley 105 can make fixed-point rotations to decrease friction. When the second button 606 is pushed, the first pulley 104 on the sliding body 103 slide down to press the wire rope 106, and thereby causes a displacement of one end of the wire rope 106, driving the limiting plate 1000 to retract inward the open slot 610, and detaching the limiting plate 100 from the limiting slot 502. Therefore, the tie rod exterior tube 602 can act freely.

When the second button 606 is released, the limiting plate 100 enabled the limiting plate 1000 to pop up from the open slot 610 in the function of the limiting plate spring 607, and it can enter the limiting slot 502 in open slot 610 to achieve the unfolding of the slide plate 500 and frame 600. Certainly, the limiting plate 1000 can enter the other limiting slot 502 in open slot 610 to achieve the unfolding of the slide plate 500 and frame 600. When the limiting plate 1000 enters the limiting slot 502, one part of it is located in the open slot 610, and the other part is located in the limiting slot 502, thereby serving as a function of limiting connection.

Figure 24:
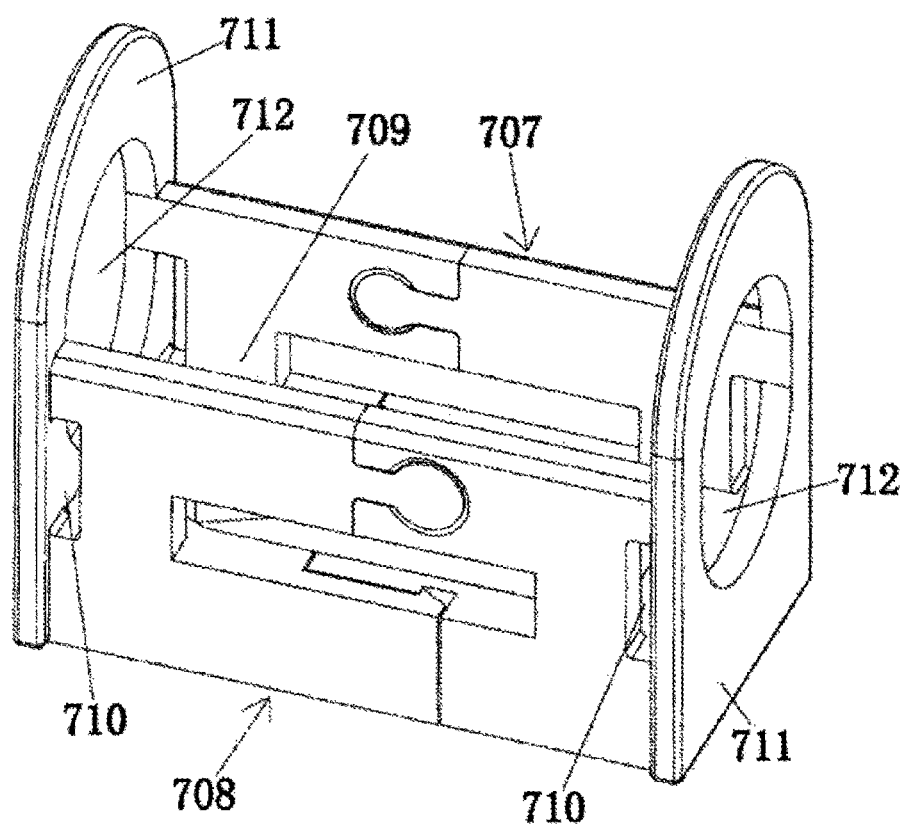
FIG. 24 is the structure diagram of the button shell according to one aspect of the present disclosure.
Figure 25:
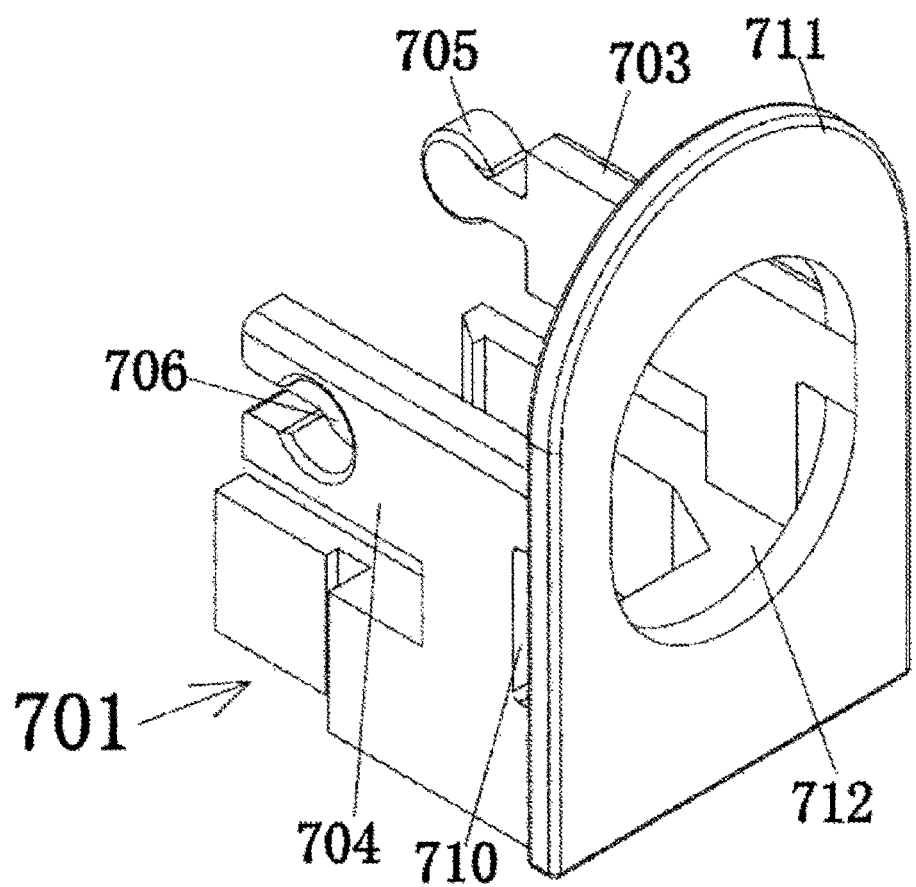
FIG. 25 is the structure diagram of the first split frame according to another aspect of the present disclosure.
Figure 26:
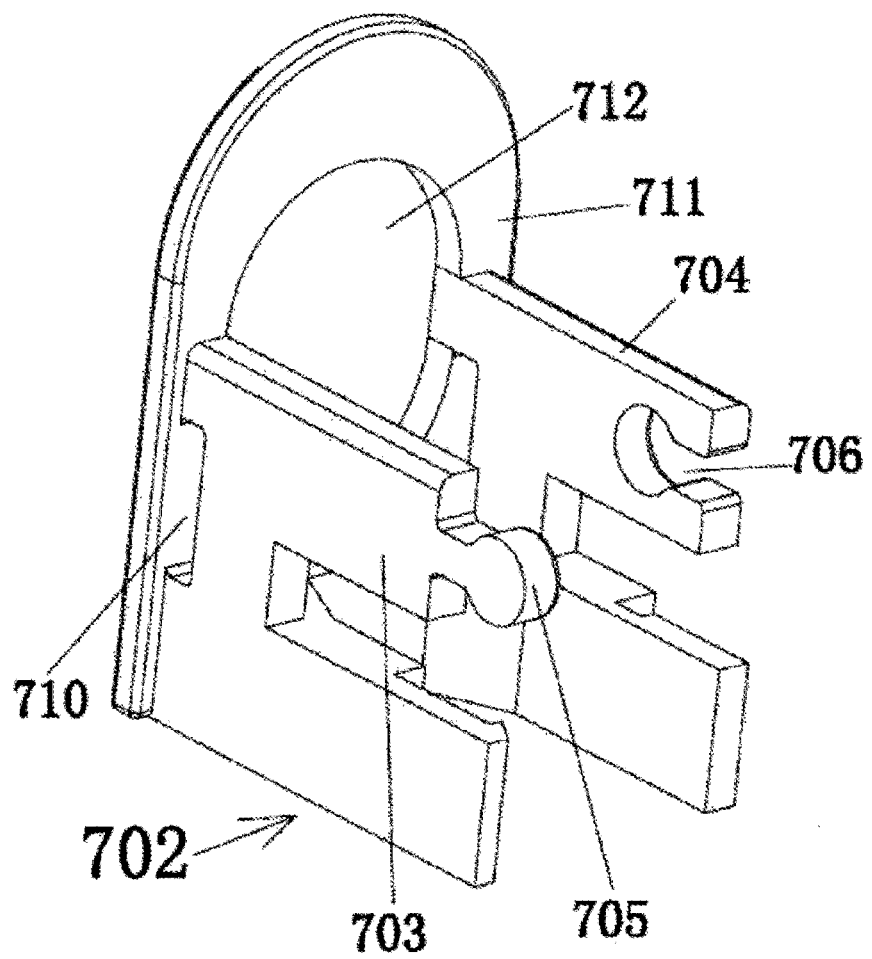
FIG. 26 is the structure diagram of the second split frame according to another aspect of the present disclosure.
Figure 27:
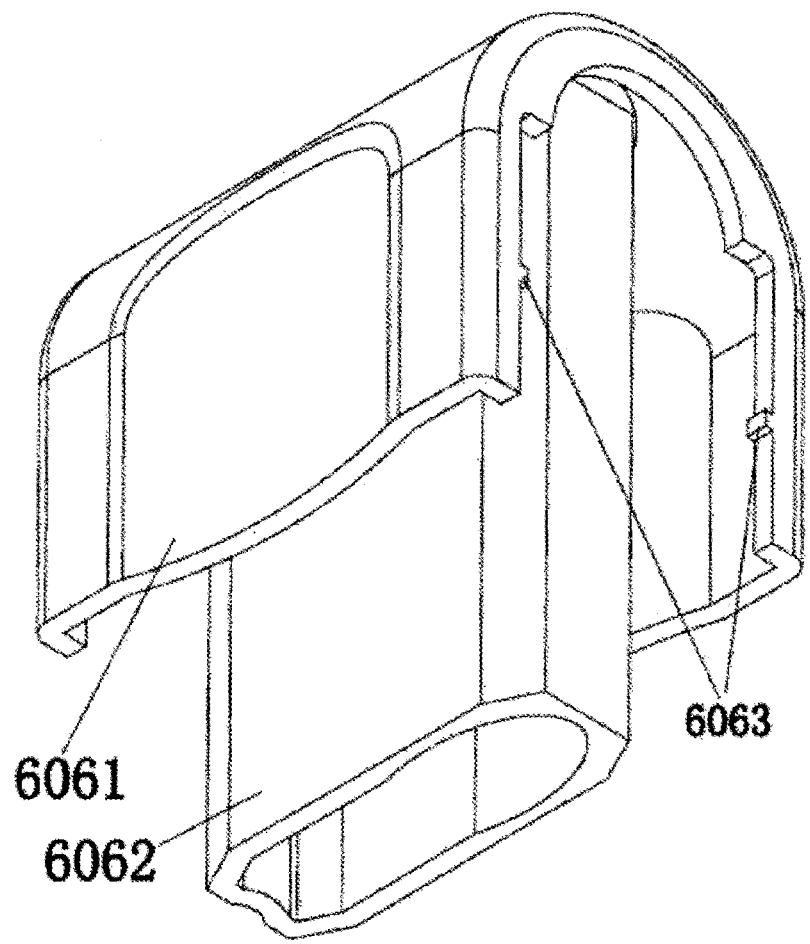
FIG. 27 is the spatial structure diagram of the second button according to another aspect of the present disclosure.
Figure 28:
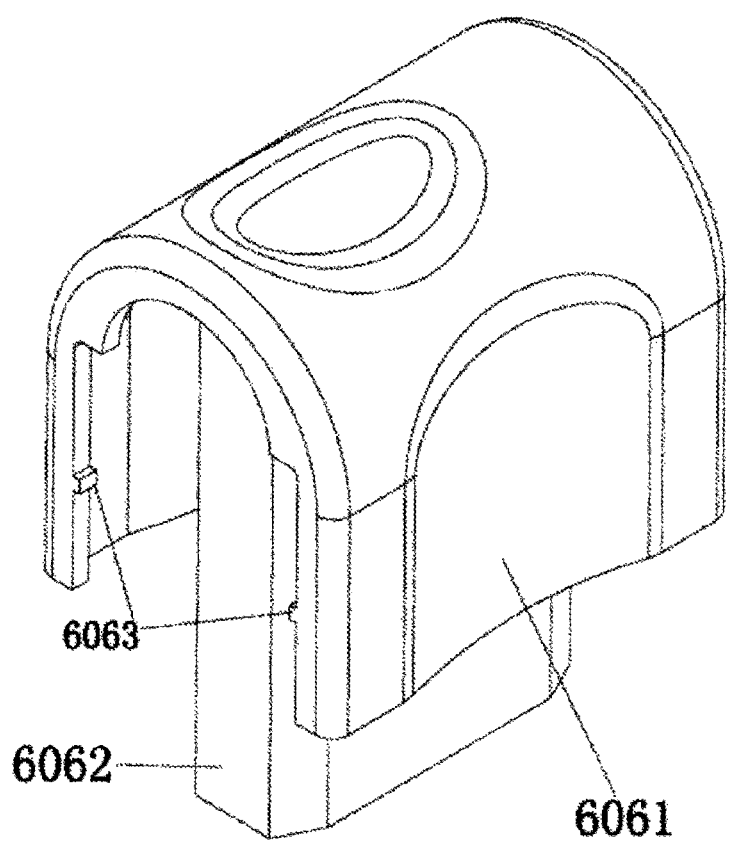
FIG. 28 is the structure diagram of one side of the second button according to another aspect of the present disclosure.
Figure 29:
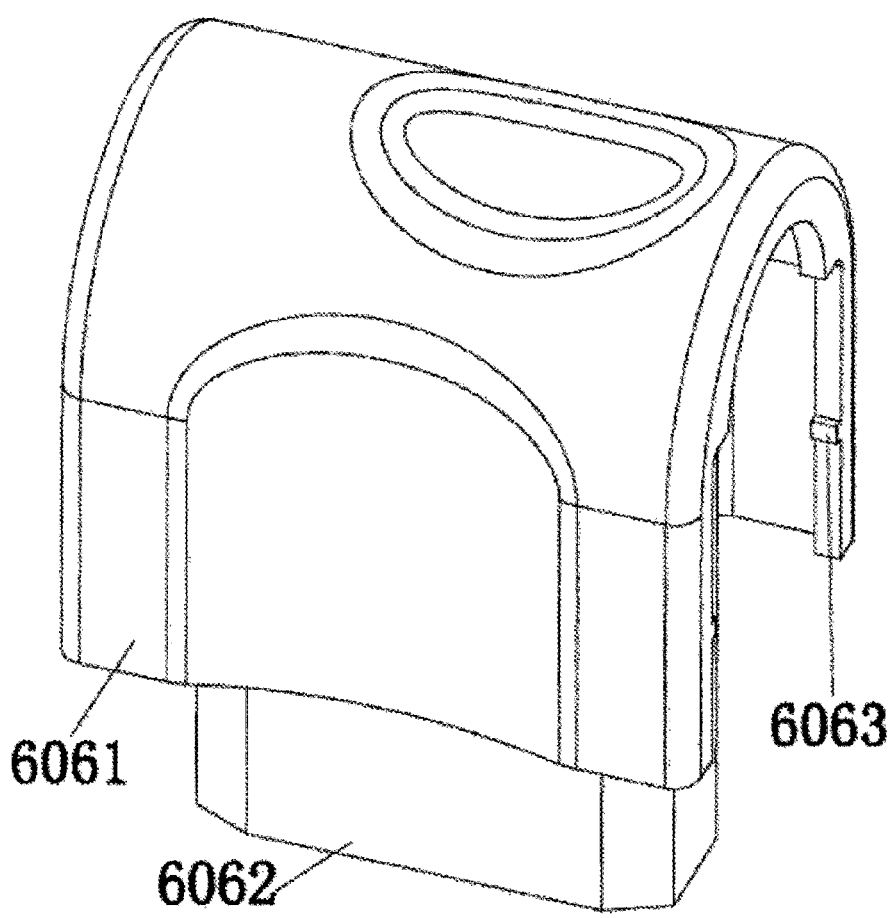
FIG. 29 is the structure diagram of the other side of the second button according to another aspect of the present disclosure.
Figure 30:
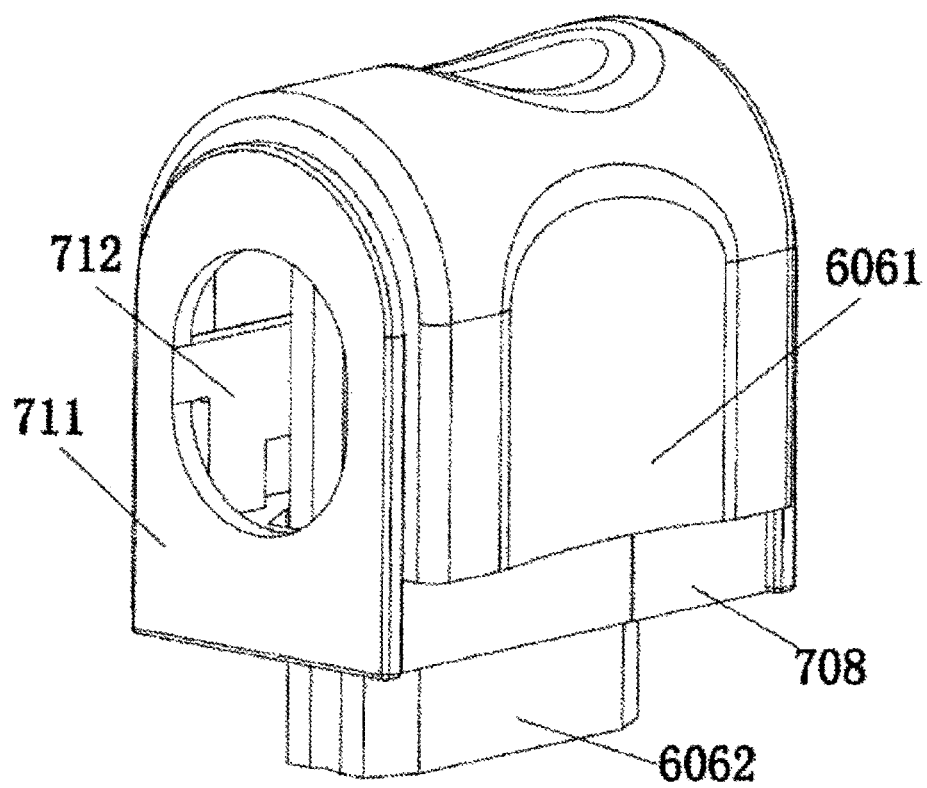
FIG. 30 is the structure diagram of the second button and button shell being assembled together according to another aspect of the present disclosure.

As illustrated in FIG. 24 to FIG. 26, the present disclosure also provides a kind of button shell that includes the split frame. The split frame is provided with the first baffle 703 and second baffle 704. The first baffle 703 is provided with the limiting protrusion 705, and the second baffle 704 is provided with the limiting groove 706. The there is a clearance between the first baffle 703 and second baffle 704. The split frame comprises the first split frame 701 and second split frame 702. The first split frame 701 has the same structure with the second split frame 702; the limiting protrusion 705 of the first split frame 701 is embedded into the limiting groove 706 of the second split frame 702, forming the first supporting plate 707; the limiting protrusion 705 of the second split frame 702 is embedded into the limiting groove 706 of the first split frame 701, forming the second supporting plate 708. The button shell 700 comprises the spatial accommodation constituted by the clearance between the first supporting plate 707 and second supporting plate 708, which is provided with button limiting slot 710.

The first baffle 703 and second baffle 704 of the split frame are equipped with button limiting slot 710. The split frame is provided with the third baffle 711. The first baffle 703 and second baffle 704 are respectively connected with the third baffle 711 which is equipped with the baffle hole 712.

As illustrated in FIG. 27 to FIG. 30, the second button 606 comprises the arc connector 6061 and embedded bolt part 6062 interlinked with the arc connector 6061. The inner surface of the arc connector 6061 is provided with the limiting bump 6063. The embedded bolt part 6062 is located in the accommodation space 709, which can slide up and down within this accommodation space 709. The limiting bump 6063 is located in the button limiting slot 710.

Figure 31:
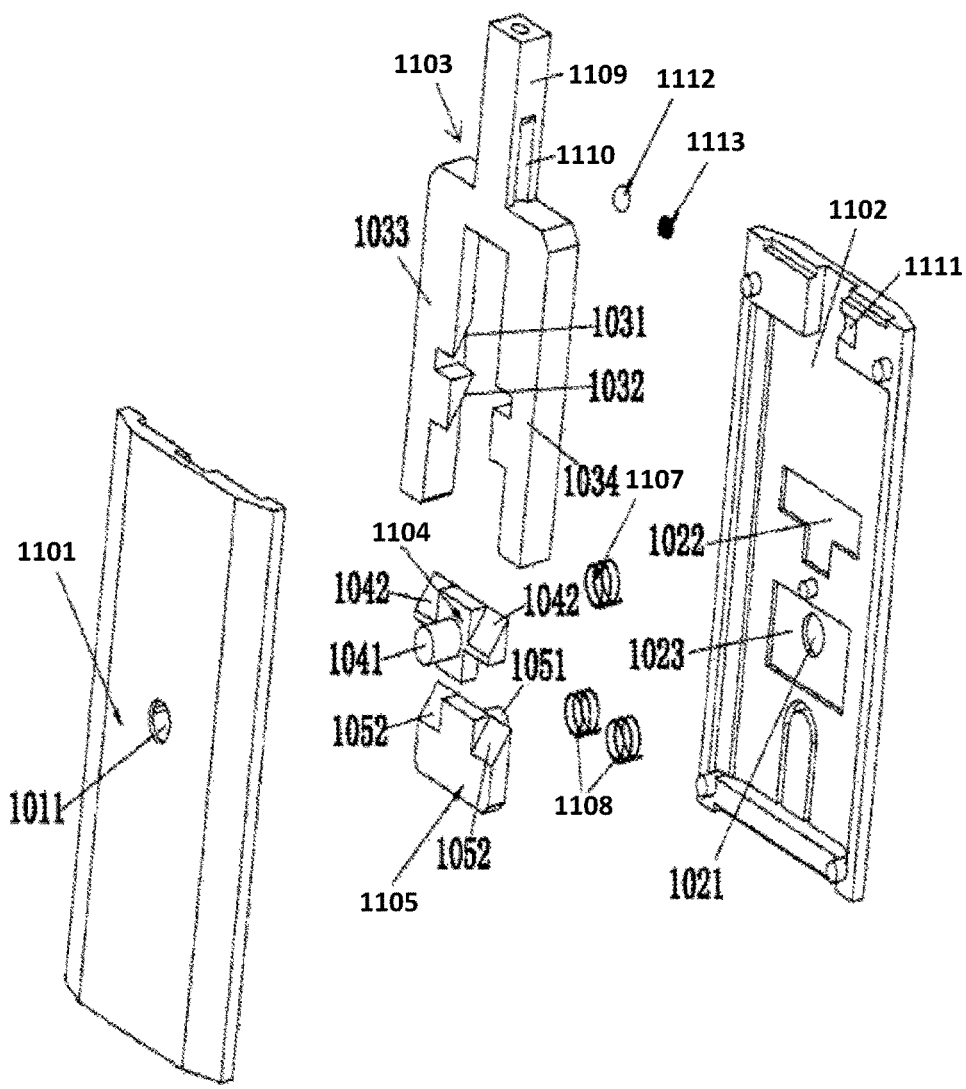
FIG. 31 is the breakdown structure diagram of the limiting plate control mechanism according to another aspect of the present disclosure.
Figure 32:
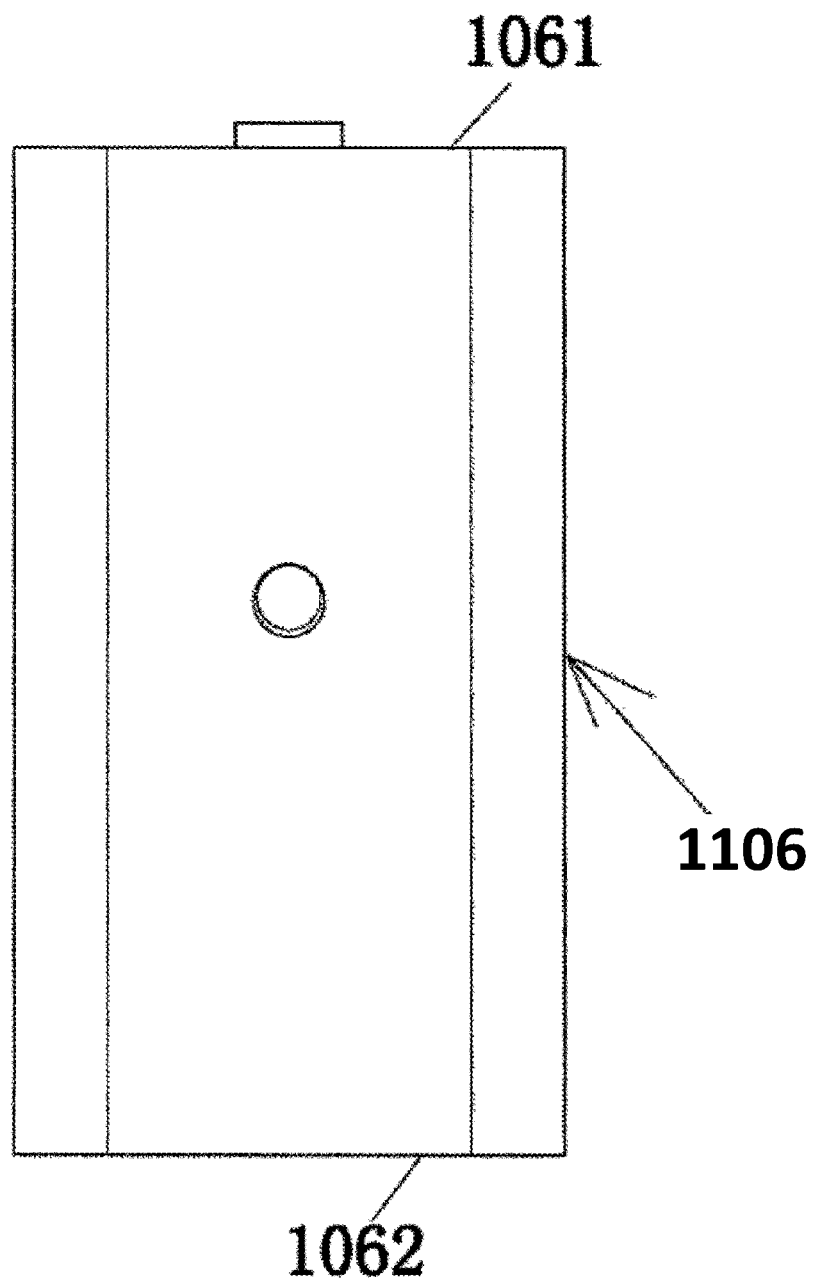
FIG. 32 is the structure diagram of the limiting plate control mechanism according to the third aspect of the present disclosure.
Figure 33:
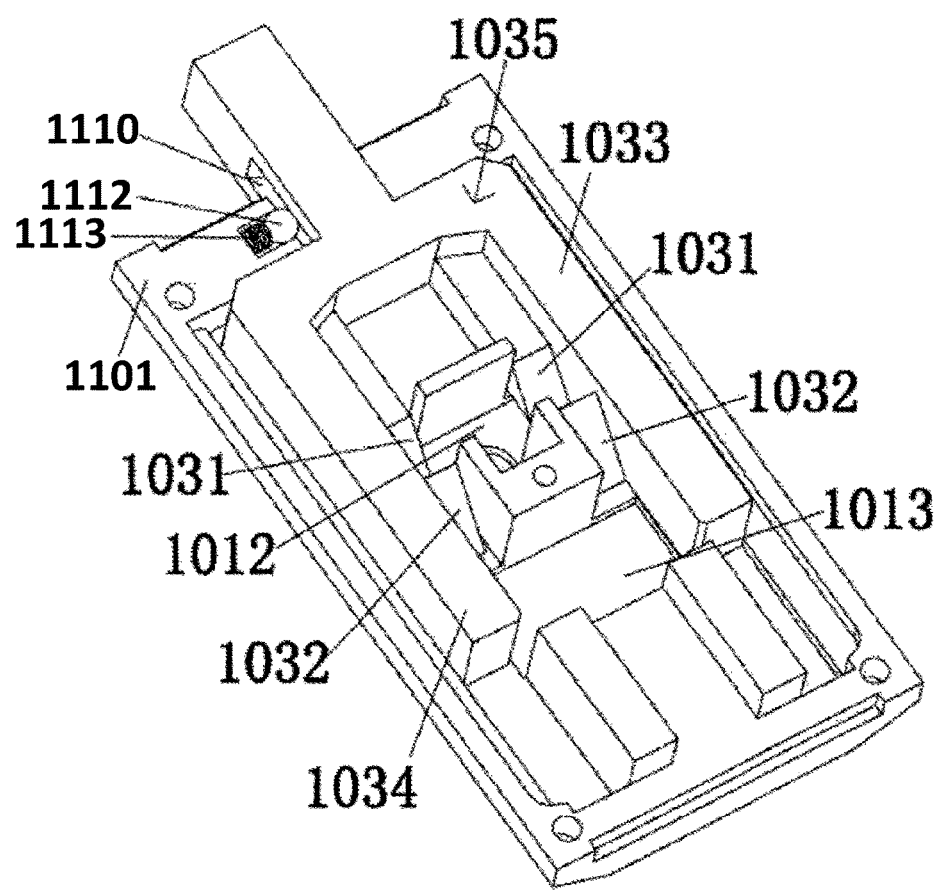
FIG. 33 is the structure diagram of the sliding pressing block and first shell being assembled together according to the third aspect of the present disclosure.

As illustrated in FIG. 31 to FIG. 33, the present disclosure also provides a kind of limiting plate control device, including the first shell 1101, second shell 1102, sliding pressing block 1103, first slider 1104, second slider 1105, first elastic element, second elastic element. The first shell 1101 and second shell 1102 composes the cavity shell 1106; the sliding pressing block 1103, first slider 1104, second slider 1105, first elastic element and second elastic element are all located in the cavity shell 1106; the sliding pressing block 1103 can move longitudinally along the cavity shell 1106; the first slider 1104 and second slider can slide transversely along the cavity shell 1106. The longitudinal direction refers to the direction from the end part of the cavity shell 1106 to the root part 1062 of it; the transverse direction refers to the direction from the first shell 1101 to second shell 1102. The first slider limiting slot and second slider limiting slot are installed in the cavity shell 1106; the first slider 1104 is located in the first slider limiting slot, and the second slider 1105 is located in the second slider limiting slot. The first shell 1101 is provided with the first shell hole 1011; the first slider 1104 is provided with the first slider protrusion 1041, and the second slider 1105 is provided with the second slider protrusion 1051; the second shell 1102 is provided with the second shell hole 1021. The first elastic element is pressed against the first slider 1104, making the first slider protrusion 1104 stick out of the first shell hole 1011. The second elastic element is pressed against the second slider 1105, making the second slider protrusion 1051 be located in the cavity shell 1106. The first slider protrusion 1041 is in clearance fit with the first shell hole 1011, and the second slider protrusion 1051 is in clearance fit with the second shell hole 1021. The first slider 1104 and second slider 1105 are longitudinally placed in succession in the cavity shell 1106. This limiting plate control device comprises extrusion mechanism which comprises the first extrusion part 1031 and second extrusion part 1032 connecting with the sliding pressing block 1103. The extrusion mechanism is used to achieve that: when pushing down the sliding pressing block 1103, the first extrusion part 1031 squeezes the first slider 1104, making the first slider protrusion 1041 retract back into the cavity shell 1106, and the second extrusion part 1032 doesn't squeeze the second slider 1105 and continue pushing down the sliding pressing block 1103 to make the second extrusion part 1032 squeeze the second slider 1105, making the second slider protrusion 1051 retract back into the cavity shell 1106.

The sliding pressing block 1103 comprises the sliding element 1035 composed by the first connector 1033 and second connector 1034. The sliding element 1035 is of the shape of N. The number of the first extrusion part 1031 is two, and that of the second extrusion part 1032 is two as well. One first extrusion part 1031 and one second extrusion part 1032 are successively set up in the inner side surface of the first connector 1033, and the other first extrusion part 1031 and the other second extrusion part 1032 are successively set up in the inner side surface of the second connector 1034. The first shell 1101 is provided with the first split slot 1012, and the second shell 1102 is provided with the first split chamber 1022. The first split slot 1012 and first split chamber 1022 are fastened, composing the first slider limiting slot. The mentioned first shell hole 1011 is located in the first split slot 1012; the first shell 1101 is provided with the second split slot 1013, and the second shell 1102 is provided with the second split chamber 1023. The second split slot 1013 and second chamber 1023 are fastened, composing the second slider limiting slot. The second shell hole 1021 is located within the second split chamber 1023; the first slider limiting slot and second slider limiting slot are all located within the open space of the sliding element 1035.

The first slider 1104 is provided with two first slope 1042s, and the second slider 1105 is provided with two second slope 1052s. Two extrusion part 1031s are respectively provided with the first inclined surfaces used to coordinate respectively with the two first slope 1042s. Two second extrusion part 1032s are respectively provided with the second inclined surface 1052s used to coordinate respectively with the two second slopes.

The first elastic element is the first spring 1107, and the second elastic element is the second spring 1108. The sliding pressing block 1103 is provided with the extending part 1109 connected with the sliding element 1035, which is provided with longitudinal chute 1110. The inner surface of the end part of the cavity shell 1061 is equipped with the transverse chute 1111. This limiting plate control device also comprises the steel ball 1112 and the third spring 1113. The extending part 1109 sticks out of the end part of the cavity shell 1061. The steel ball 1112 and third spring 1113 are all located in the transverse chute 1111. The third spring 1113 squeezes the steel ball 1112 into the longitudinal chute 1110, and the steel ball 1112 can roll within the longitudinal chute 1110 and transverse chute 1111.

Figure 34:
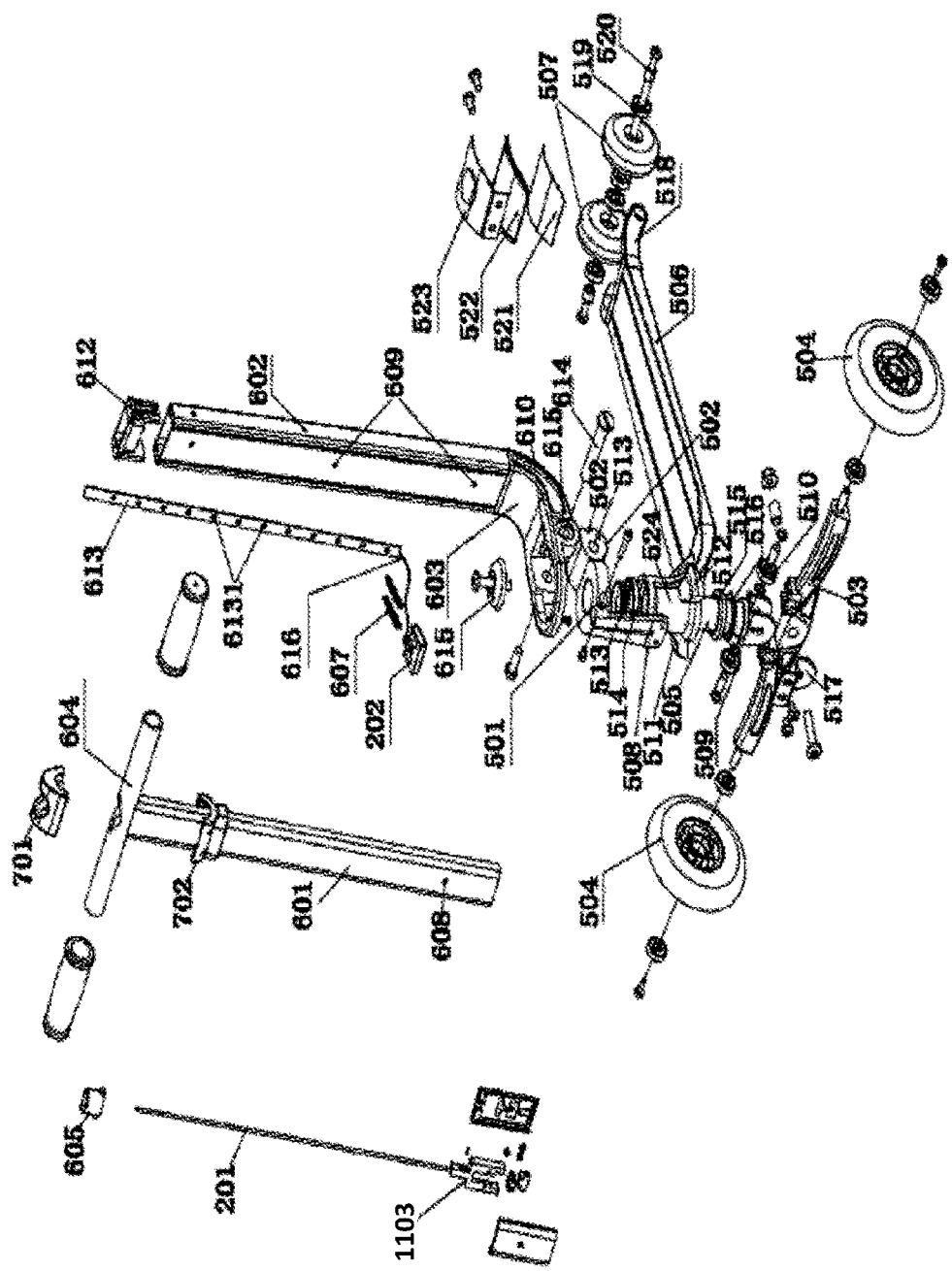
FIG. 34 is the breakdown structure diagram of the scooter luggage according to the third aspect of the present disclosure.

As illustrated in FIG. 34, combining with FIG. 5 to FIG. 8, FIG. 15 to FIG. 20, the present disclosure also provides a kind of scooter luggage equipped with the limiting plate control mechanism, including the link rod 201, limiting plate 202, scooter body 300 and luggage 400. The scooter body 300 comprises the slide plate 500 and frame 600 that connect with each other, and are able to open and fold. The luggage 400 is installed on the frame 600; the link rod 201 is connected with the sliding pressing block 103. The scooter frame 600 comprises the tie rod inner tube 601, tie rod exterior tube 602, tie line 616 and tension sheet 613. The cavity shell 1106 and link rod 201 are all located in the tie rod inner tube 601. The link rod 201 can move within the tie rod inner tube 601. The cavity shell is fixed into the tie rod inner tube 601 which is provided with the tie rod inner tube hole 608. The first slider protrusion 1041 sticks out of the tie rod inner tube hole 608. The tie rod inner tube 601 is located in the tie rod exterior tube 602, which can move in the tie rod exterior tube 602. The tie rod exterior tube 602 is provided with several tie rod exterior tube hole 609s where the first slider protrusion 1041s can stretched out. The tension sheet 613 is located in the tie rod exterior tube 602, which can move within the tie rod exterior tube 602. It is also provided with the tension sheet hole 6131 in which the second slider protrusion 1051 can be embedded. One end of the tie line 616 is connected with the tension sheet 613, and the other end of it is connected with the limiting plate 202 used to limit the folding and unfolding of the slide plate 500 and frame 600.

The frame 600 comprises the angle seat 603, handle 604, button 605 and limiting plate spring 607. The button 605 is connected with the link rod 201, which is installed on the end part of the tie rod inner tube 601. The handle 604 is installed on the end part of the tie rod inner tube 601. The tie rod exterior tube 602 is connected with the angle seat 603 which is provided with an open slot 610. The limiting plate 202 is located in the open slot 610. One end of the limiting plate spring 607 is pressed against the open slot 601 is pressed against the root part of the limiting plate 202. The slide plate 500 is provided with an angle head 501 which forms a flexible connection with the angle seat 603. The angle head 501 is provided with at least two limiting slot 502s in which the limiting plate 202 can be embedded.

As for the technicians in present field, the present invention is obviously not limited to the details of the above-described demonstrative embodiments. Furthermore, the present invention may be embodied in other specific forms without departing from the spirit or essential characteristics thereof. The present embodiment is, therefore, to be considered in all respects as illustrative and not restrictive. The scope of the invention being indicated by the appended claims rather than by the foregoing description, and all changes which come within the meaning and range of equivalency of the claims are therefore intended to be embraced therein. In addition, as for the technicians in present field, the above-mentioned embodiments can be combined and complemented on the premise of non-confliction, which comes within the protection scope of the present invention. Ant drawings in claims ought not to be regarded as the claim involved in the restriction. In addition, the term "include/comprise" does not rule out other units or procedures, and the singular does not rule out the plural.

The invention claimed is:

1. A device for controlling a limiting plate, including a first shell, a second shell, a slide pressing block, a first slider, a second slider, a first elastic element, and a second elastic element, the first shell and the second shell assembled into a cavity shell, wherein:
   the slide pressing block, the first slider, the second slider, the first elastic element and the second elastic element are positioned in the cavity shell;
   the slide pressing block can slide longitudinally along the cavity shell and the first slider and the second slider can slide transversely along the cavity shell, where the longitudinal direction refers to the direction from an end part of the cavity shell to a root part of the cavity shell, where the transverse direction refers to the direction from the first shell to the second shell;
   the cavity shell comprises a first slider limiting slot and a second slider limiting slot, where the first slider is positioned in the first slider limiting slot and the second slider is positioned in the second slider limiting slot;
   the first shell comprises a first shell hole;
   the first slider comprises a first slider protrusion and the second slider comprises a second slider protrusion;
   the second shell comprises a second shell hole;
   the first elastic element presses against the first slider such that the first slider protrusion extends out of the first shell hole;
   the second elastic element presses against the second slider such that the second slider protrusion is positioned in the cavity shell;
   the first slider protrusion is in clearance fit with the first shell hole and the second slider protrusion is in clearance fit with the second shell hole;
   the first slider and second slider are positioned in succession along the longitudinal direction in the cavity shell, and
   wherein the device comprises an extrusion mechanism which comprises a first extrusion part and a second extrusion part connected with the slide pressing block, wherein the extrusion mechanism is configured such that: when pushing down the slide pressing block, the first extrusion part presses against the first slider such that the first slider protrusion retracts back into the cavity shell without the second extrusion part pressing against the second slider, and when the slide pressing block is further pushed down, the second extrusion part presses against the second slider such that the second slider protrusion retracts back into the cavity shell.

2. The device of claim 1, wherein the slide pressing block comprises a sliding element that comprises a first connector and a second connector, where the sliding element is 'N' shaped;
   wherein the first and second extrusion parts are first first and second extrusion parts and the device comprises the first first extrusion part and the first second extrusion part successively positioned in an inner surface of the first connector, and the device comprises a second first extrusion part and a second second extrusion part successively positioned in the inner surface of the second connector;
   wherein the first shell comprises a first split groove and the second shell comprises a first split chamber, where the first split groove and first split chamber are engaged to form the first slider limiting slot, the first shell hole located in the first split groove;
   wherein the first shell comprises a second split groove and the second shell comprises a second split chamber, where the second split groove and second chamber are engaged to form the second slider limiting slot, the second shell hole located within the second split chamber; and
   wherein the first slider limiting slot and second slider limiting slot are located within an open space of the sliding element.

3. The device of claim 2, wherein the first slider comprises two first slopes and the second slider comprises two second slopes; wherein the first and second first extrusion parts each comprise a first inclined surface that coordinates respectively with one of the two first slopes; and wherein the first and second second extrusion parts each comprise a second inclined surface that coordinates respectively with one of the two second slopes.

4. The device of claim 3, wherein the first elastic element is a first spring and the second elastic element is a second spring;
   wherein the slide pressing block comprises an extension part that is connected with the sliding element, the extension part comprising a longitudinal chute;
   wherein an inner surface of a cavity shell end part comprises a transverse chute;
   wherein the device further comprises a steel ball and a third spring;
   wherein the extension part extends out of the end part of the cavity shell;
   wherein the steel ball and third spring are located in the transverse chute; and
   wherein the third spring is configured to push the steel ball into the longitudinal chute, where the steel ball can roll within the longitudinal chute and transverse chute.

5. A scooter luggage comprising a device of claim 1, the scooter luggage comprising a link rod, a limiting plate, a scooter body, and a luggage, wherein:
- the scooter body comprises a slide plate and a frame that connect with each other and can be folded and unfolded;
- the luggage is mounted on the frame;
- the link rod is connected with the sliding pressing block;
- the scooter frame comprises an inner rod tube, an outer rod tube, a connecting thread and a tension sheet, where the cavity shell and the link rod are positioned in the inner rod tube, where the link rod can move within the inner rod tube and the cavity shell is fixed into the inner rod tube, the inner rod tube comprising an inner rod tube hole;
- the first slider protrusion extends out of the inner rod tube hole, where the inner rod tube is movably located in the outer rod tube;
- the outer rod tube comprises several outer rod tube holes from where the first slider protrusion can extend out; and
- the tension sheet is movably located in the outer rod tube and comprises a tension sheet hole in which the second slider protrusion can be embedded, where one end of the connecting thread is connected with the tension sheet and the other end of the connecting thread is connected with the limiting plate to restrict folding and unfolding of the slide plate and frame.

6. The scooter luggage of claim 5, wherein the frame comprises a corner seat, a handle, a button and a limiting plate spring, wherein:
- the button is connected with the link rod and is mounted onto an end part of the inner rod tube;
- the handle is mounted onto the end part of the inner rod tube;
- the outer rod tube is connected with the corner seat, the corner seat comprising an open slot, where the limiting plate is located in the open slot, one end of the limiting plate spring pressed against the open slot, the other end of the limiting plate spring pressed against the root part of the limiting plate; and
- the slide plate comprises a corner head, the corner head flexibly connected with the corner seat, where the corner head comprises at least two limiting slots in which the limiting plate can be embedded.

7. The scooter luggage of claim 6, wherein the slide plate comprises a front axle, a front wheel, a front fork, a peddle support, a rear wheel, and a fork crown cover, wherein:
- the fork crown cover is rotationally fixed to an angle head;
- the front fork is connected with the front axle;
- the fork crown cover is rotationally connected with the front fork; the corner head comprises a connection sheet, the connection sheet connected with the front axle;
- the scooter luggage comprises two front wheels that are respectively mounted onto an end of the front axle; and
- a front end of the peddle support is connected with the fork crown cover and a tail end of the peddle support is equipped with the rear wheel.

8. The scooter luggage of claim 7, wherein the front axle comprises a first guide wheel and a second guide wheel, wherein the fork crown cover comprises a first supporting inclined surface and a second supporting inclined surface, the front fork located between the first guide wheel and the second guide wheel, the first guide wheel in contact with the first supporting inclined surface, the second guide wheel in contact with the second supporting inclined surface.

* * * * *